(12) United States Patent
Griffith et al.

(10) Patent No.: US 11,144,923 B1
(45) Date of Patent: Oct. 12, 2021

(54) PROGRESSIVE AUTHORIZATION OF INFORMATION BASED ON CONFIDENCES OF USER IDENTITIES

(71) Applicant: Amazon Technologies, Inc., Seattle, WA (US)

(72) Inventors: Mark Griffith, Issaquah, WA (US); Richard Koehler, Seattle, WA (US); Lakshmi Saligram, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 993 days.

(21) Appl. No.: 15/407,167

(22) Filed: Jan. 16, 2017

(51) Int. Cl.
*G06Q 20/40* (2012.01)
*H04L 29/06* (2006.01)

(52) U.S. Cl.
CPC ..... *G06Q 20/40145* (2013.01); *H04L 63/083* (2013.01); *H04L 63/0861* (2013.01); *H04L 63/102* (2013.01); *G06F 2221/2103* (2013.01); *G06F 2221/2111* (2013.01)

(58) Field of Classification Search
CPC . H04L 63/083; H04L 63/0861; H04L 63/102; G06Q 20/40145
USPC .......................................................... 705/50
See application file for complete search history.

(56) References Cited

U.S. PATENT DOCUMENTS

| 5,722,418 | A | 3/1998 | Bro |
| 7,280,975 | B1 | 10/2007 | Donner |
| 7,356,507 | B2 | 4/2008 | Bezos et al. |
| 7,877,299 | B2 | 1/2011 | Bui |
| 8,781,622 | B2 | 7/2014 | Mockus et al. |
| 9,324,098 | B1 | 4/2016 | Agrawal et al. |
| 9,472,043 | B2 | 10/2016 | Mockus et al. |
| 9,967,750 | B1 | 5/2018 | Fernandez |
| 10,136,327 | B1 | 11/2018 | Fernandez |
| 10,269,196 | B1 | 4/2019 | Fernandez |
| 10,438,200 | B1 | 10/2019 | Griffith et al. |
| 2006/0293956 | A1 | 12/2006 | Walker et al. |
| 2007/0197261 | A1 | 8/2007 | Humbel |
| 2013/0066464 | A1 | 3/2013 | Maskatia et al. |
| 2015/0039357 | A1 | 2/2015 | Segal et al. |
| 2015/0310444 | A1* | 10/2015 | Chen et al. |
| 2016/0210448 | A1* | 7/2016 | Hamlin et al. |
| 2016/0307258 | A1* | 10/2016 | May |
| 2017/0004487 | A1* | 1/2017 | Hagan et al. |
| 2017/0046693 | A1* | 2/2017 | Haldenby et al. |

(Continued)

*Primary Examiner* — James D Nigh
*Assistant Examiner* — Yin Y Choi
(74) *Attorney, Agent, or Firm* — Knobbe, Martens, Olson & Bear, LLP

(57) ABSTRACT

Systems and techniques are disclosed for progressive authorization of information. One of the methods includes obtaining information from a user device indicating a user identity of a user operating the user device, the user device being in communication with a content server. A confidence associated with the user identity of the user is determined. Requests from the content server for profile information associated with the user identity are responded to, such that authorization levels of requested profile information are determined to be satisfied based on the confidence. Upon a positive determination, use of the requested profile information is granted. Upon a negative determination, prompts for additional identifying information are provided on the user device.

18 Claims, 9 Drawing Sheets

(56) References Cited

U.S. PATENT DOCUMENTS

2018/0184168 A1* 6/2018 Matthews et al.
2018/0288594 A1 10/2018 Kim

* cited by examiner

PROGRESSIVE AUTHORIZATION OF INFORMATION BASED ON CONFIDENCES OF USER IDENTITIES

BACKGROUND

Interactive systems commonly require users to utilize user names/passwords to access private information stored by servers. For instance, a web page that presents emails of users can require that the users input respective user names/passwords, and only upon proper authentication of entered user names/passwords will emails be presented. In this way, private or sensitive information of a user may be tightly controlled, and only provided upon stringent assurances that a person requesting the private or sensitive information has a right to the information.

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

DETAILED DESCRIPTION

Although particular embodiments are described herein, other embodiments, including embodiments that do not provide all of the benefits and features set forth herein, will be apparent to those of ordinary skill in the art.

This specification describes a system (e.g., the progressive authorization determination system 200 described below) that maintains user profile information of users (e.g., users who are enrolled or registered with the system 200), and provides portions of user profile information to third party servers to, as will be described, (1) customize user experiences based on user profile information, (2) reduce complexities associated with workflows, such as implementing transactions between the third party servers and users, and so on. As will be described, the user profile information can include (1) personally identifiable information of users, such as full names, addresses, payment information, and so on, and (2) preference information of users, such as product preferences (e.g., a preferred size of clothing, a ranking of sports teams that interest the user, and so on).

As an example of a workflow, the system can function as a payment service effecting transfer of payment from a user of a user device to a merchant. In this specification, a payment service is an electronic service that enables a consumer to provide, or confirm, payment to another entity, such as a merchant, with payment being provided, or confirmed, using a system, such as a system not maintained or controlled by the merchant.

In a first example workflow, the user can view products of the merchant on a content item (e.g., web page) associated with the merchant. For instance, the user can view an electronic catalog, and specify particular products. The user can interact with the content item to specify products for purchase, and can initiate a purchasing (e.g., check-out) process. In the first example workflow, the user can indicate that the user is to utilize the payment service, and the content item can force the user to provide a user name/password associated with the user's user profile information maintained by the system. Upon authentication of the user name/password by the system, the user can input a shipping address, input a particular payment instrument (e.g., credit card, debit card) to be utilized, and then confirm actual payment to the merchant.

Figure 1A:
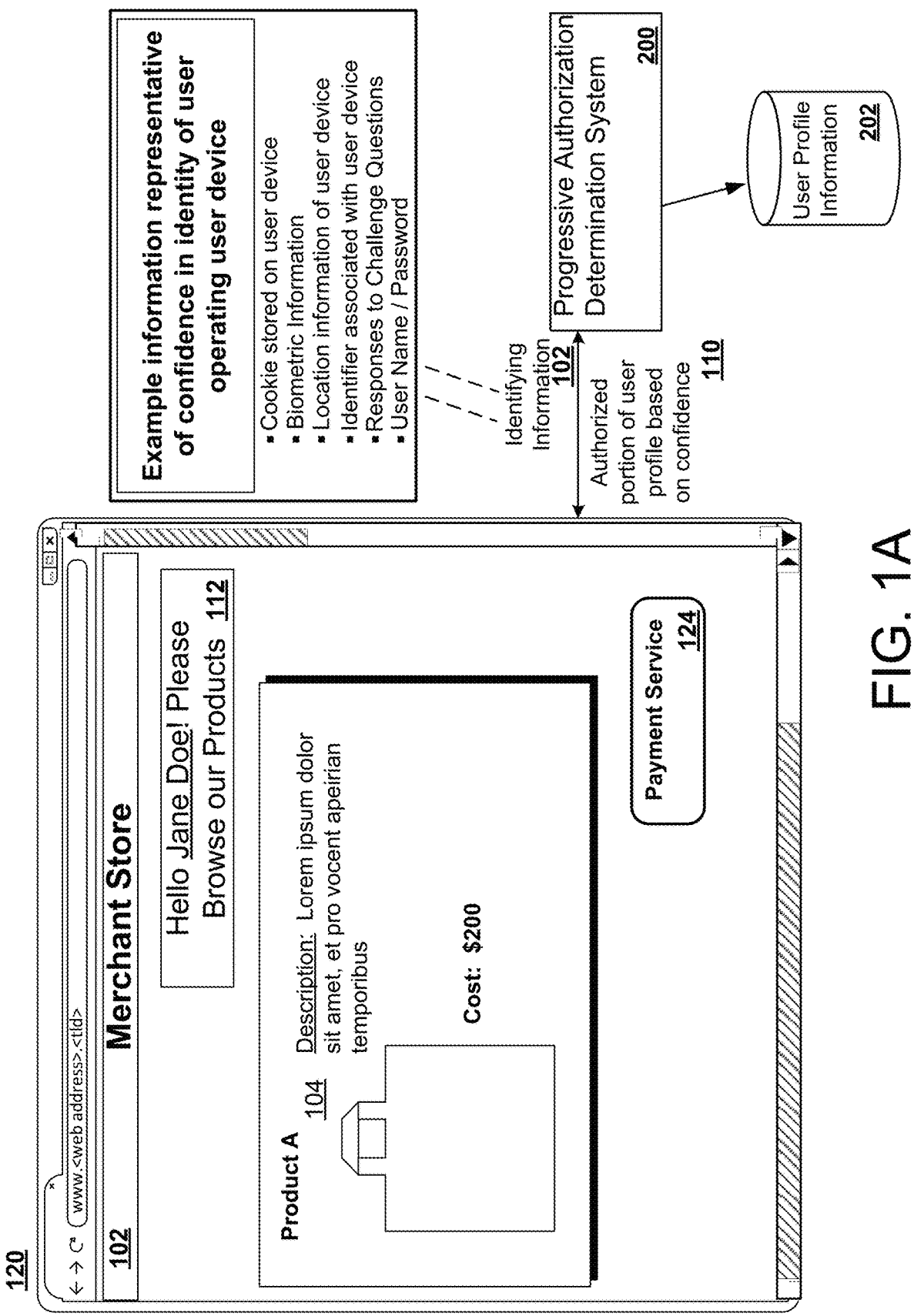
FIG. 1A illustrates an example user interface presenting a portion of user profile information authorized according to confidence information.
Figure 1B:
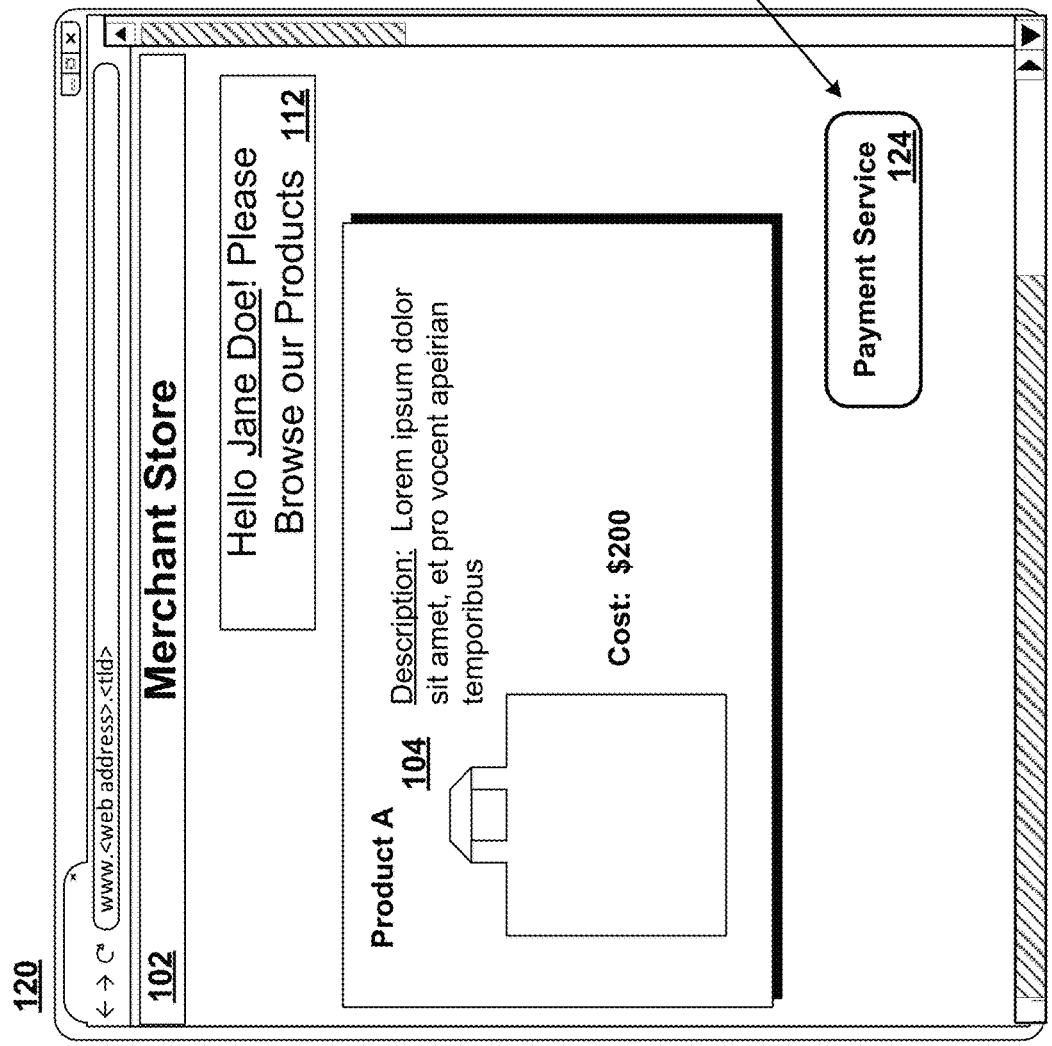
FIG. 1B illustrates the example user interface and interactions with a widget.
Figure 1C:
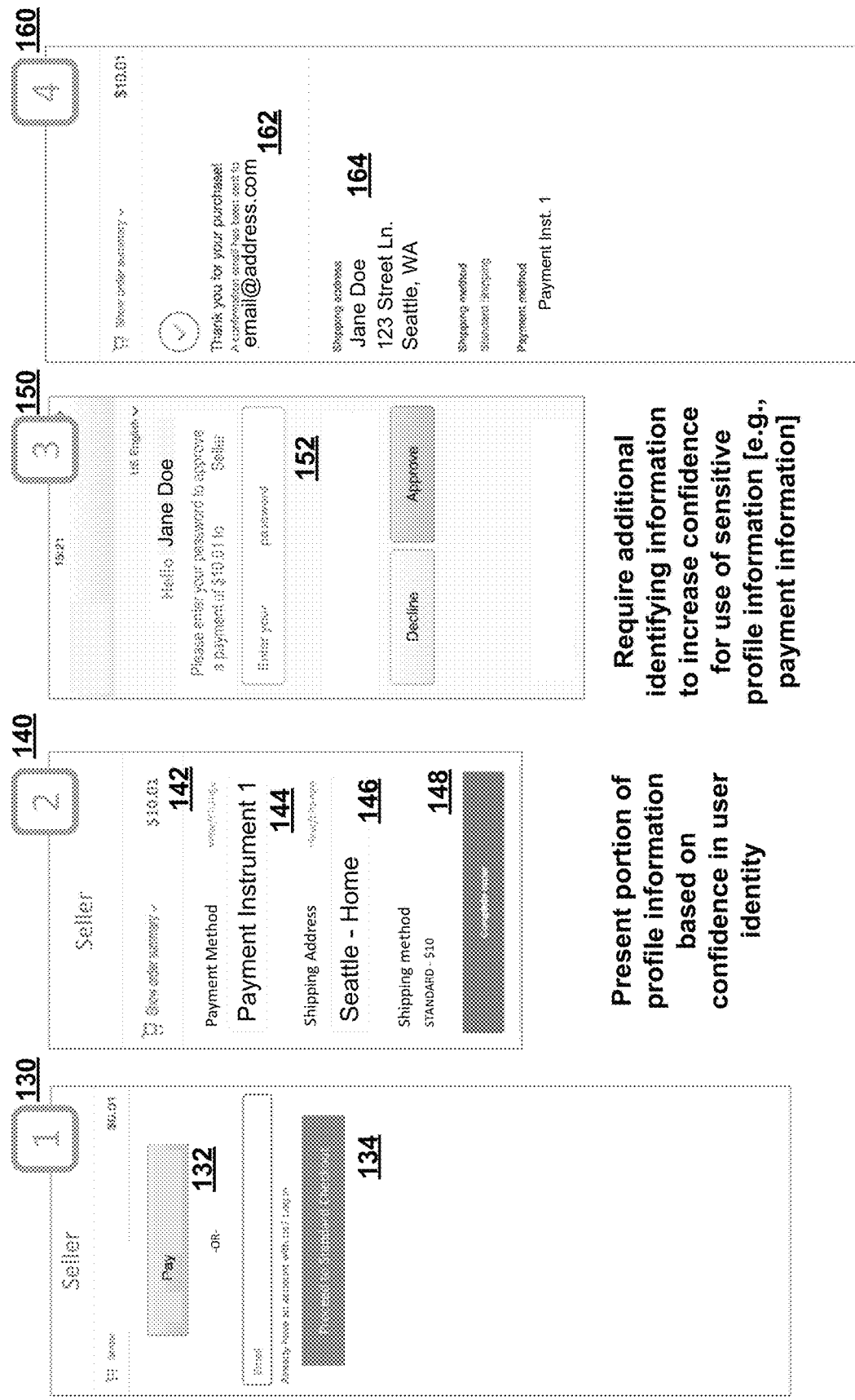
FIG. 1C illustrates example user interfaces associated with progressive authorization of information.

In contrast, and as will be further described with respect to FIGS. 1A-1C, a second example workflow can provide a more customized user experience and provide portions of the user's user profile to the merchant on an 'as-needed' basis. For instance, the system can provide initial user profile information to the merchant, such as a first name of the user, and the content item (e.g., web page) can present the first name. Additionally, the system can provide user preference information to the merchant, such as an ordered ranking of sports teams the user prefers, a preferred clothing color, size, and so on. The merchant can then customize the content item to present products based on the user preference information. The user can interact with the content item to specify products for purchase, and the user can initiate a purchasing (e.g., check-out) process. In the second example workflow, the user can indicate a preference to utilize the payment service, and the user's default payment method and shipping address can be automatically provided to the user (e.g., based on the user profile information), for instance a reduced version of the shipping address that is not personally identifiable information can be presented (e.g., 'Seattle address', 'Seattle—home address'). The user can then indicate use of the default payment instrument and shipping address, and confirm actual payment to the merchant. The system can then prompt the user to confirm the user's identity, such as via inputting of a password, inputting of biometric information (e.g., obtaining a thumb print of the user, obtaining voice information of the user), and then actual payment can be made to the merchant. Confirming the user's identity can, in general, be obtained in several ways. For example, the system can utilize information the user knows (e.g., password, indication of recent purchases) to prove identity, or the system can utilize information directed to the user (e.g., biometric information), or the system can utilize something the user has or carries (e.g., gemalto token, interaction with a device known to be utilized by the user, for example the system can direct the user to verbally confirm identity to a personal digital assistant, the system can direct the user to interact with a Dash button, for example 'press the Dash button in your laundry room three times'), and so on.

As described above, the first example workflow includes the user (1) specifying products, (2) initiating a check-out process with a payment service, (3) confirming the user's user account with the payment service, (4) inputting payment and shipping details, and (5) confirming payment to the merchant via the payment service. In contrast, the second example workflow utilizes user profile information at each step to customize the user experience, and includes the user (1) specifying products from products customized to the user, (2) initiating a check-out process with the payment service, (3) confirming default payment and shipping details automatically populated from the user profile information, and (4) confirming the user's identity to effect payment to the merchant via the payment service.

Since the second example workflow utilizes user profile information of a user, the system can ensure that, prior to providing any user profile information to the merchant, the system is confident that a person operating the user device corresponds to the user. That is, the user profile information can range from a first name up to personally identifiable information such as a precise address of the user, payment information of the user, and so on, the system can require increases in confidence (e.g., increases in a stored or maintained, confidence score) when providing increasingly private and/or personal information.

As will be described, portions of user profile information of a user can be associated with respective authorization levels, and for a merchant to access a particular portion of user profile information, the system can require a determination of a particular confidence that a person operating a user device corresponds to the user (e.g., corresponds to same user profile). For example, and with reference to the second example workflow described above, the system can provide initial user profile information to the merchant, such as a first name of the user, upon receiving information indicating that a cookie on the user device is associated with the user. Since the first name is relatively innocuous, the confidence can be relatively low, and in some implementations the mere inclusion of a cookie on the user device can suffice. That is, given that many people can have a same first name, a high amount of privacy can be maintained through mere presentation of the first name. Optionally, a uniqueness associated with a first name can be utilized when determining confidences. As an example, presenting a name of 'John' can be associated with a lower confidence than presenting a unique name, for example 'Charlemagne.' That is, the system can compare a determined confidence score for the user with a threshold associated with providing the first name. The thresholds can be based on user preferences, for instance the user can indicate that providing his/her first name is associated with an increased threshold as compared to a different user.

For user preference information, such as a ranking of sports teams preferred by the user, and so on, the system can require a greater confidence (e.g., confidence score) prior to providing the user preference information to the merchant. For instance, the system can determine that, based on a location of the user device (e.g., an IP address), the user device is at a location known to be utilized by the user, and can determine that the confidence of the user device being operated by the user is therefore increased. In another instance, the system can cause a prompt to be presented to the user for additional information, such as a prompt for the user to enter a response to a challenge question (e.g., 'what high school did you attend?', 'what was your first pet's name?'), or a prompt for the user to provide biometric information (e.g., 'place your thumb on a thumbprint reader of the user device', 'speak into the user device', and so on). In this way, the system can ensure that the confidence of the user identity of the person operating the user device is increased with respect to the initial information, such as the first name of the user.

In this specification, a confidence associated with a user identity represents a likelihood that a person operating a user device is associated with the user identity. For instance, the system can obtain information from the user device, such as a cookie, identifying a user identity, and the system can determine a first confidence based on the information. Since a cookie may provide limited assurances of the user identity of a person operating a user device, the first confidence can be less than a second confidence, in which the system further obtains biometric information associated with the person (e.g., the system can receive information indicating that the person has a same thumbprint as the user identity). In this specification, biometric information includes any information associated with human characteristics that is usable to identify people.

While the above description focuses on a user viewing a content page, as will be described below, the techniques described herein can be utilized without content pages. For instance, the user can interact with an intelligent personal assistant that outputs speech via speakers of a user device, and receives speech from the user via microphones of the user device. The user can interact with the intelligent personal assistant to purchase products from a merchant (e.g., the user can say, 'personal assistant, purchase socks from [MERCHANT]'). In this scenario, the system can provide user profile information of the user to the merchant (e.g., a server associated with the merchant), such as user preferences regarding the products (e.g., a size of socks, a material of the socks, color of the socks), so that the merchant (e.g., a server associated with the merchant) can respond with available socks that comport with the user's preferences. In this way, the user can avoid having to specify numerous details regarding features of the products the user is to purchase. Similar to the above, the system can provide the user preference information upon determining that a person operating the user device corresponds to the user. Since the input to the user device in this scenario is audio based, the system can determine whether a voice signature of the user corresponds to a voice being received by the user device. Upon a positive determination, the system can provide the user preference information to the merchant. Further description of personal digital assistants and associated user devices are included in U.S. Patent Pub. 2015/0170665 titled "ATTRIBUTE-BASED AUDIO CHANNEL ARBITRATION," and U.S. Patent Pub. 2016/0042748 titled "VOICE APPLICATION ARCHITECTURE," each of which are hereby incorporated by reference in their entireties for all purposes.

FIG. 1A illustrates an example user interface 120 presenting a portion of user profile information authorized according to confidence information of a user viewing the user interface 120. As described above, a person operating a user device can request a content item 102, for instance a content item associated with a merchant store, and can interact with the content item 102 to specify one or more products 104 to purchase via a particular payment service 124.

As illustrated in FIG. 1A, a user device is presenting the content item 102, and the user device is providing identifying information to a system (e.g., the progressive authorization determination system 200), with the identifying information indicating a particular user identity of a user (e.g., a person) operating the user device. As will be described, the content item 102 can include code (e.g., executable code, HTML, interpretable code) that is associated with the system, and can provide the identifying information directly from the user device to the system. As illustrated, example identifying information can include a cookie associated with the particular user being stored on the user device, biometric information of the user, location information of the user device, a unique identifier (e.g., MAC address, UUID) of the user device, and so on. As an example of identifying information including a cookie, the user device may have previously been utilized by the particular user to authenticate to the system (e.g., a user name/password were provided to the system), and the system may have generated a cookie identifying the particular user for storage on the user device.

The progressive authorization determination system 200 can determine a confidence (e.g., a confidence score) associated with the particular user identity based on the received identifying information. For instance, the presence of a cookie on the user device can indicate to the system that the particular user, at some point, operated the user device. However, the user device may have gotten lost or stolen since that point, or may presently be operated by a friend of the particular user. Thus, while the presence of the cookie is indicative of the particular user identity, the confidence is not high. Therefore, the system can compare known locations of the user device while being operated by the particular user, with a present location of the user device, and if the locations match then the system can increase the confidence. Similarly, the system can compare a unique identifier of a user device known to be operated by the particular user, with a presently received unique identifier, and if the identifiers match then the system can increase the confidence. In this way, the progressive authorization determination system 200 can determine a confidence (e.g., a confidence score) indicating a likelihood that the particular user is presently operating the user device.

Optionally, the system can determine a confidence (e.g., a negative confidence score) indicating a likelihood that that the particular user is not operating the user device. For example, the system can utilize information describing network pages (e.g., web pages) requested by the user device, and compare the network pages to network pages requested (e.g., commonly requested, such as greater than a threshold), or types of network pages (e.g. news, sports, tech information), requested by the particular user. Additionally, the system can access information describing interactions with by the particular user with a user device, such as how hard the particular user presses keys, keyboard typing speed, mouse movement information, and so on, and the system can compare the information to an operator of the user device. The system can maintain information identifying portions of user profile information 202 that are not to be provided based on the negative confidence score (e.g., a particular portion of user profile information 202 is not to be provided if the negative confidence score is greater than a threshold).

The system 200 can then access user profile information 202 associated with the particular user, and provide a portion 110 of the user profile information to the merchant. For instance, upon the content item 102 being presented on the user device, the merchant can provide a request to the system 200 for user profile information, and the system 200 can provide the portion 110 of the user profile information 202 in response to the request. Additionally, upon the content item 102 being presented on the user device, the system 200 can automatically provide the portion 110 of the user profile information 202 to the merchant. As described above, user profile information 202 can be associated with respective authorization levels, and the system 200 can provide the portion 110 of user profile information that is associated with an authorization level satisfied by the determined confidence (e.g., determined confidence score). Therefore, the merchant can only receive user profile information that is commensurate with the likelihood that the particular user is presently operating the user device.

As illustrated in FIG. 1A, the merchant has a portion of user profile information 110 indicating a name of the particular user, and has tailored presentation of the content item 102 to the particular user, for instance the content item includes the name (e.g., 'Hello Jane Doe!' 112). Optionally, the user profile information 110 may indicate a first name of the particular user, an anonymized name (e.g., a name selected by the particular user, such as a handle or other name; a shortened version of the particular user's name), and so on (e.g., the particular user can specify an extent to which merchants, or particular merchants, can receive user profile information, and can indicate whether merchants are to receive a first name only). As will be described, the merchant can be provided a portion of user profile information 110 based on a confidence (e.g., confidence score) associated with the particular user's identity. Thus, the merchant can receive a first name based on a first determined confidence (e.g., a cookie associated with the particular user being present on the particular user's user device; optionally, the particular user can specify that only his/her first name is to be provided), a full name based on a second confidence (e.g., a cookie being present; a cookie being present along with the particular user having previously indicated that the user device is authorized with respect to the content item 102), and so on (e.g., as will be described, users can specify, or indicate, user profile information 110 that can be provided, and/or specify or indicate information associated with thresholds for access or use of user profile information 110 by merchants). This updating customizes the user experience, and can help the user to feel confident with the merchant as the user can have assurances that the merchant is in good standing with the system 200 (e.g., as will be described, merchants can similarly register with the system 200, and the system can disconnect from merchants determined to be risky, for instance based on complaints associated with the merchant, and so on).

As will be described below, with respect to FIG. 1D, the merchant can receive additional user profile information of the particular user (e.g., user preference information), for instance in response to a request from the merchant for the user profile information, or automatically by the system to the merchant.

FIG. 1B illustrates the example user interface 120 and interactions with a presented widget 124 (e.g., display created by a widget 124) included in the content item 102. As described above, the system 200 can function as a payment service, and upon the particular user specifying one or more products (e.g., Product A 104) that are to be purchased, the particular user can interact with the presented widget 124 to complete the transaction. Optionally, the widget can be code included in the content item 102 that is associated with the system, and the presented widget 124 can present information associated with the particular user confirming a transaction with the merchant (e.g., confirming payment instrument, shipping address, and so on, as illustrated in FIG. 1C). Optionally, the widget can be code included in the content item 102 by the merchant, and upon user interactions with the presented widget 124, the widget 124 can trigger presentation of one or more payment services (e.g., a payment service associated with the system 200, a direct entry of a payment instrument, and so on).

In addition to a presented widget 124, the merchant can incorporate features of the presented widget 124 into the content item 120. For instance, the content item 120 can receive information (e.g., obfuscated information), such as a shortened form of the particular user's address, shortened form of the particular user's preferred payment instrument (e.g., '[Bank] Card'), and so on. And the particular user can interact with the content item 120 to indicate that the system 200 is to perform the actual transaction. In this way, the payment process is largely seamless, simplifying the information presented to the particular user.

FIG. 1C illustrates user interfaces associated with progressive authorization of information. As described above, the particular user of the content item 102 can initiate a check-out process to obtain one or more products (e.g., product 104). As illustrated in FIG. 1C, the check-out process can include several steps (e.g., steps 130, 140, 150, 160), with each step requiring use of user profile information that is associated with a respective level of authorization. As will be described, the particular user can proceed to subsequent steps, and the system 200 can determine whether a confidence in the particular user's identity satisfies each level of authorization. If the system 200 determines that the confidence does not satisfy a level of authorization, the system 200 can require that the particular user to provide additional identifying information, such as a password, biometric information, and so on.

User interface 130 includes options for proceeding with payment, and includes a first option 132 associated with a payment service of the system 200, and a second option 134 associated with a different payment service (e.g., direct entry of payment instrument details, such as credit card number, billing and shipping address, and so on).

Upon the particular user interacting with the first option 132, user interface 140 can be presented to the particular user (e.g., presented on the user device of the particular user). As illustrated in user interface 140, an order summary 142 is included, along with user profile information associated with the particular user, such as a preferred or default payment instrument 144 and a preferred or default shipping address 146. The presented payment instrument 144 and shipping address 146 are presented in user interface 140 in a shortened form that does not include personally identifiable information. That is, the particular user can have multiple shipping addresses, and the system 200 can present a default or preferred (e.g., as specified by the particular user) shipping address referenced according to a shortened name (e.g., a home address of the particular user). Similarly, the particular user can have multiple payment instruments, and the system can present a default or preferred payment instrument referenced according to a shortened name (e.g., 'payment instrument 1', that lacks specific details of the payment instrument). In this way, the system 200 can present useful information in the user interface 140, while avoiding the personally identifiable information that would otherwise require a high confidence that the particular user is operating the user device.

In this way, the user interface 140 can allow the particular user to confirm a payment instrument 144 and shipping address 146, without requiring a user name/password, for instance as in the first example workflow described above. Optionally, the payment instrument 144 and shipping address 146 can be presented in the user interface 140 upon the system receiving limited identifying information associated with the particular user, such as a cookie associated with the particular user being on the user device, a unique identifier associated with the user device corresponding to a known user device operated by the particular user, and so on. That is, the user profile information indicating a preferred or default payment instrument 144 (e.g., shortened description of the payment instrument) and a preferred or default shipping address 146 (e.g., shortened description of the shipping address), can be associated with an authorization level satisfied by the limited identifying information. Optionally, a default or preferred payment instrument 144 and shipping address 146 can be modified on user interface 140, such that a different payment instrument 144 and shipping address 146 can be selected for use. That is, shortened descriptions of other previously indicated payment instruments and shipping addresses of the particular user can be presented, and a different payment instrument or shipping address can be selected.

In addition to textual information describing preferred payment instrument 144, shipping addresses 146, and so on, images (e.g., favicons, avatars, user selected sketches, images, and so on) can be presented that indicate information tot eh particular user. For example, instead of "Seattle-Home" 146, an image selected by the particular user to represent "Seattle-Home" 146 can instead be included in user interface 140. Optionally the system 200 can determine an image to be presented, such as an image of the particular user's home (e.g., as obtained from a publicly available database). In this way, sensitive information can be guarded through obfuscation via abstract image presentations.

Optionally, the user interface 140 can present additional descriptive information associated with the payment instrument 144 or shipping address 146, for instance the particular user can indicate that he/she is to view the full shipping address. In response, the system can determine whether a confidence associated with whether the particular user is operating the user device enables the system to present the more detailed full shipping address. That is, the user profile information associated with a full shipping address can be associated with a higher authorization level, and the system can determine whether it has received sufficient identifying information to provide the full shipping address for presentation in the user interface 140. Upon a negative determination, the system can cause one or more prompts to be presented in the user interface 140 or otherwise on the user device, that requests additional identifying information. For instance, a prompt can request entry of a password associated with the particular user, or request biometric information (e.g., a thumbprint of a person operating the user device), and so on.

User interface 150 can be presented upon interaction with selectable object 148 indicating acceptance of the presented payment instrument 144 and shipping address 146. As illustrated, user interface 150 is requesting that additional identifying information be provided, such that payment information of the particular user can be accessed. That is, payment information indicated in user profile information can be associated with a high authorization level, and the system 200 can require a confidence (e.g., confidence score) greater than a particular threshold for access to the payment information. As an example, and as illustrated, the user interface 150 includes a prompt for entry of a password associated with the particular user. In other examples, the prompt may request biometric information, responses to challenge questions, and so on. Optionally, based on monitoring identifying information 102 associated with the particular user, the system 200 may determine that a determined confidence (e.g., confidence score) associated with the particular user's identity is greater than a threshold (e.g., authorization threshold) associated with payment information. In this case, user interface 150 may not be presented, and upon interaction with selectable object 148, the user interface 160 can be presented.

Upon successful access to the payment information, for example via entry of a password, user interface 160 can be presented confirming that the transaction has been completed. That is, the system 200 can implement the transaction and provide payment to the merchant (e.g., the merchant can never receive any particular payment information, such as credit card details). Since the system 200 has sufficient identifying information indicating that a person operating the user device corresponds to the particular user (e.g., through entry of the password, as described above), the user interface 160 can include personally identifiable information associated with the particular user. As illustrated, user interface 160 specifies an email address 162 of the particular user and a full shipping address 164 of the particular user.

Thus, as illustrated in FIGS. 1A-1C, the system 200 can actively determine whether particular portions of user profile information can be presented based on a sufficiency of received identifying information. That is, the system can respond to requests for portions of user profile information from (1) the user device (e.g., as described above, the particular user can request that a transaction be implemented, request a change in a default shipping address, request to view an entirety of a shortened version of a default shipping address, and so on), or (2) the merchant (e.g., the merchant, such as a server associated with the merchant, can request information to customize a content item presented on the user device, for instance the particular user can navigate on the content item to view a particular class of products, and the merchant can request user preference information associated with the particular class of products).

In all cases in which user profile information is stored, maintained, by the system 200, and/or provided by the system, users can indicate access controls (e.g., access rights) associated with their user profile information. That is, users can specify portions of user profile information that can be provided to merchants (e.g., an 'opt-in' specification) (e.g., users can indicate that particular portions, such as preferences, names, addresses, are never provided to merchants), particular thresholds of confidences in their identity prior to providing portions, and so on. Optionally, users can indicate particular merchants that can access user profile information, or particular portions of user profile information, and optionally the system 200 can monitor risk information associated with merchants (e.g., risk scores, as described in FIG. 2), and the system 200 can present risk information to users prior to the users allowing access to user profile information.

Figure 1D:
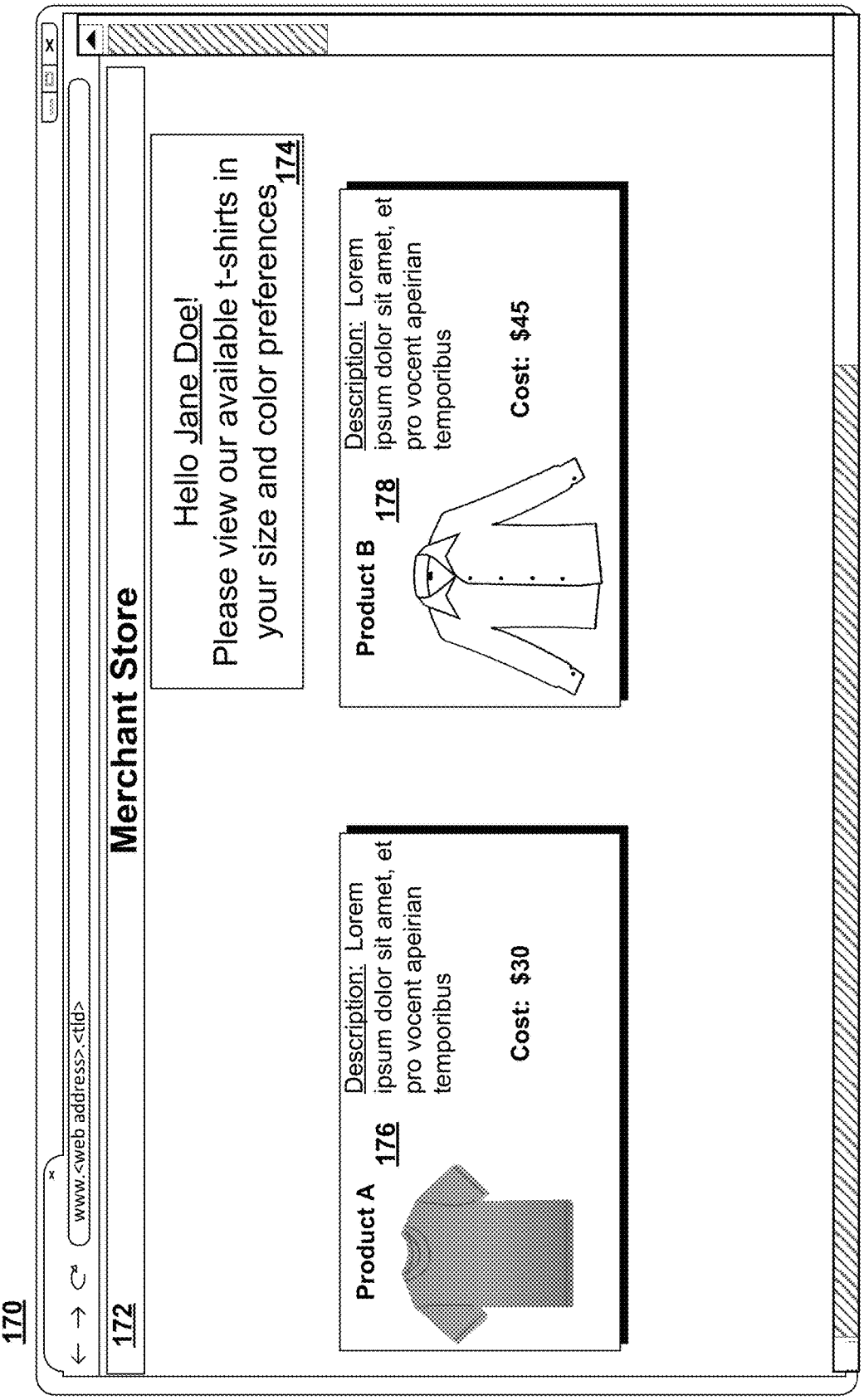
FIG. 1D illustrates an example user interface customized according to user profile information.

FIG. 1D illustrates an example user interface 170 customized according to user profile information. As described above, the content item 172 can be customized according to user profile information of a particular user viewing the content item 172 on a user device. As illustrated in FIGS. 1A-1C, a content item can be customized to present a name of the particular user, a shortened version of a default payment instrument and shipping address, and so on. Optionally, and as illustrated in FIG. 1D, the content item 172 can be customized according to user preference information indicated in user profile information associated with the particular user. As will be described, the system 200 can monitor transactions of the particular user across multitudes of merchants, and can determine user preference information. As an example of user preference information, the system 200 can determine a preferred sports team of the particular user, or a ranking of sports teams, or a preferred size of clothes, a preferred color of particular types of clothes, preferred brands, and so on. The system 200 can provide the user preference information to the merchant (e.g., a server associated with the merchant), such that the user preference information can be used by the merchant to customize the content item 172.

Access to user preference information can require a greater confidence that the user device is being operated by the particular user than access to a first name of the particular user, and the system 200 can ensure that the greater confidence is obtained prior to providing the user preference information to the merchant (e.g., to a server associated with the merchant). For instance, the system 200 can cause presentation of a prompt on the user device for entry of additional identifying information (e.g., as described above).

Additionally, and as will be described below with respect to FIG. 1E, user preference information that can be provided to merchants can be limited based on consent of the particular user. For instance, the particular user can indicate that he/she authorizes access to user profile information, or particular portions of user profile information, to merchants or particular merchants. For access or use of user profile information by merchants, the system 200 can determine whether users have consented to the user profile information being accessed or used by the merchants. Optionally, when enrolling with the system 200, users can indicate a minimum level of consent associated with user profile information, such that users' first names, shortened forms of addresses, and so on, can be provided to merchants.

As illustrated in FIG. 1D, the content item 172 is presenting a first name of the particular user 174, along with products of the merchant customized according to the received user preferences of the particular user (e.g. a first shirt 176 and a second shirt 178, selected according to a preferred size of the particular user and optionally color of the particular user). In this way, the system 200 increases the ability of the merchant site to attract and/or retain customers via tailoring presentation of products, and simplifies a process by which the particular user would need to search for shirts, resulting in time savings by the particular user. Additionally, since the system 200 ensures that received identifying information is sufficient to safely present user preference information, the particular user can have assurances that his/her user profile information is not being improperly used.

Figure 1E:
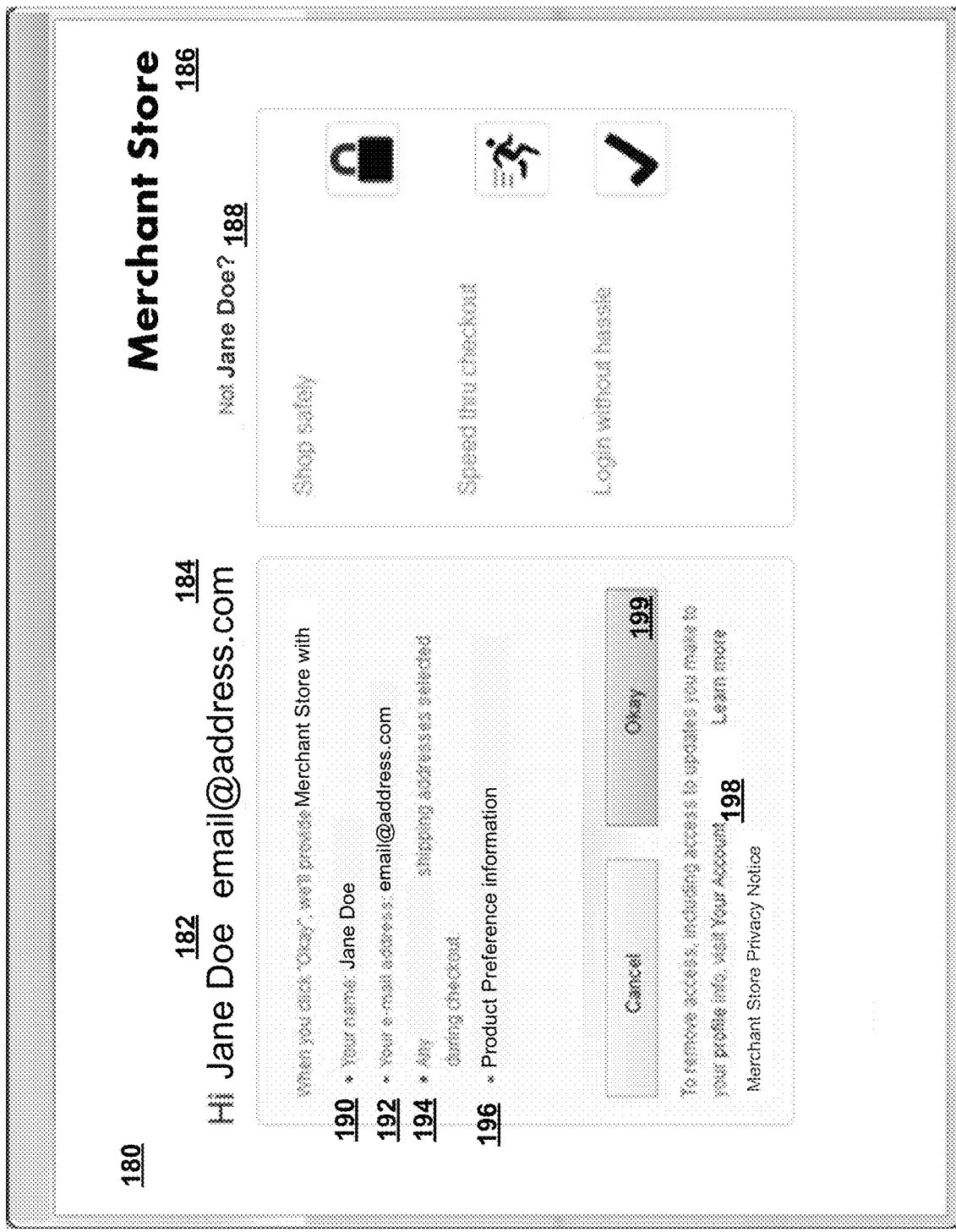
FIG. 1E illustrates an example user interface associated with obtaining user consent.

FIG. 1E illustrates an example user interface 180 associated with obtaining user consent. As described above, the system 200 can ensure that the particular user has indicated consent with respect to the system 200 providing user profile information to merchants. For example, as the particular user interacts with the merchant (e.g., interacts with the content item 120), the merchant can request user profile information (e.g., a name, preference information as illustrated in FIG. 1D, and so on), and the system 200 can determine whether (1) a confidence (e.g., confidence score) associated the particular user's identity is greater than a threshold associated with the requested information, and whether (2) the particular user has consented to the merchant accessing or using the requested information. Optionally, the system 200 can initially ensure that the confidence (e.g., confidence score) is greater than a threshold (e.g., authorization threshold) associated with requested user profile information, and then determine whether the particular user has consented to the requested user profile information being provided. Absent the necessary consent, the system 200 can provide user interface 180 for presentation to the particular user.

User interface 180 can be presented to the user, as an example, as an overlay or pop-up on the content item 120, and can be generated from code included in the content item 120 that is associated with the system 200. Information provided from the system 200 on the user interface 180, and/or received from the particular user via the user interface 180, can optionally solely be between the system 200 and the user device of the particular user. In this way, the particular user can indicate, or deny, consent to information being provided to the merchant without the merchant being directly involved.

User interface 180 includes information associated with the particular user, such as a name 182, email address 184, and so on, which the system 200 can access from the particular user's user profile information. As described above, the presented information (e.g., name 182, email address 184), may not have been provided to the merchant (e.g., merchant 186), and may appear on the user interface 180 for identification purposes (e.g., the particular user can select option 188 to indicate that he/she is not the identified person with name 182 and email address 184). User interface 180 includes information 190-196 that is to be provided to the merchant upon consent of the particular user (e.g., the particular user can indicate consent through interactions with a selectable or interactable object, such as button 199).

As described above, the information 190-196 to be provided to the merchant can be in response to a request received from the merchant or can be in response to the particular user accessing the content item 120 (e.g., initial information associated with the particular user can be provided). As illustrated, the information 190-196 can include one or more of the particular user's name 190, email address 192, shipping addresses 194 (e.g. as described above, shipping addresses 194 can be shortened versions of actual addresses), preference information 196 (e.g., as illustrated in FIG. 1D, preference information can include preferences associated with products, interests, and so on, and can be an ordered ranking of preferences, a group of a top threshold number of preferences, such as the particular user's top 5 preferred sports teams not indicated by any ranking, and so on).

While user interface 180 includes information 190-196, the information to be provided to the merchant can be a subset of the information 190-196, or can include zero or more portions of the information 190-196 along with other information. For instance, the information can indicate a first name 190 of the particular user along with a product history of the particular user, or a product history with respect to one or more types of products the merchant carries. The merchant 200 can determine that the particular user is browsing a particular type of product (e.g., home goods, sports products, kitchen, electronics, and so on), and can request that the system 200 indicate product preferences 196 and/or information associated with the particular user's product history (e.g., the system 200 can provide information indicating that the particular user utilizes a particular operating system on a mobile device, laptop, tablet, and so on, or that the particular user purchased a product with specific input/output connections, specific details of the products, and so on). As another example, the system 200 can provide search history information associated with the particular user, or the system 200 can compare products carried by the merchant with search history information, and provide, to the merchant, one or more products that the merchant carries and in which the particular user is interested. The content item 120 can then be updated to present information, such as "Hi Jane, we have the hand bag you like."

As illustrated in FIG. 1E, the particular user can later remove the merchant from being authorized to receive user profile information, for instance via selectable object 198. Additionally, the particular user can subsequently indicate that particular portions of user profile information (e.g., product preferences 196) are not to be provided to any merchants, or are only to be provided to particular merchants. In this way, the particular user can maintain fine-grain control over his/her user profile information.

Figure 2:
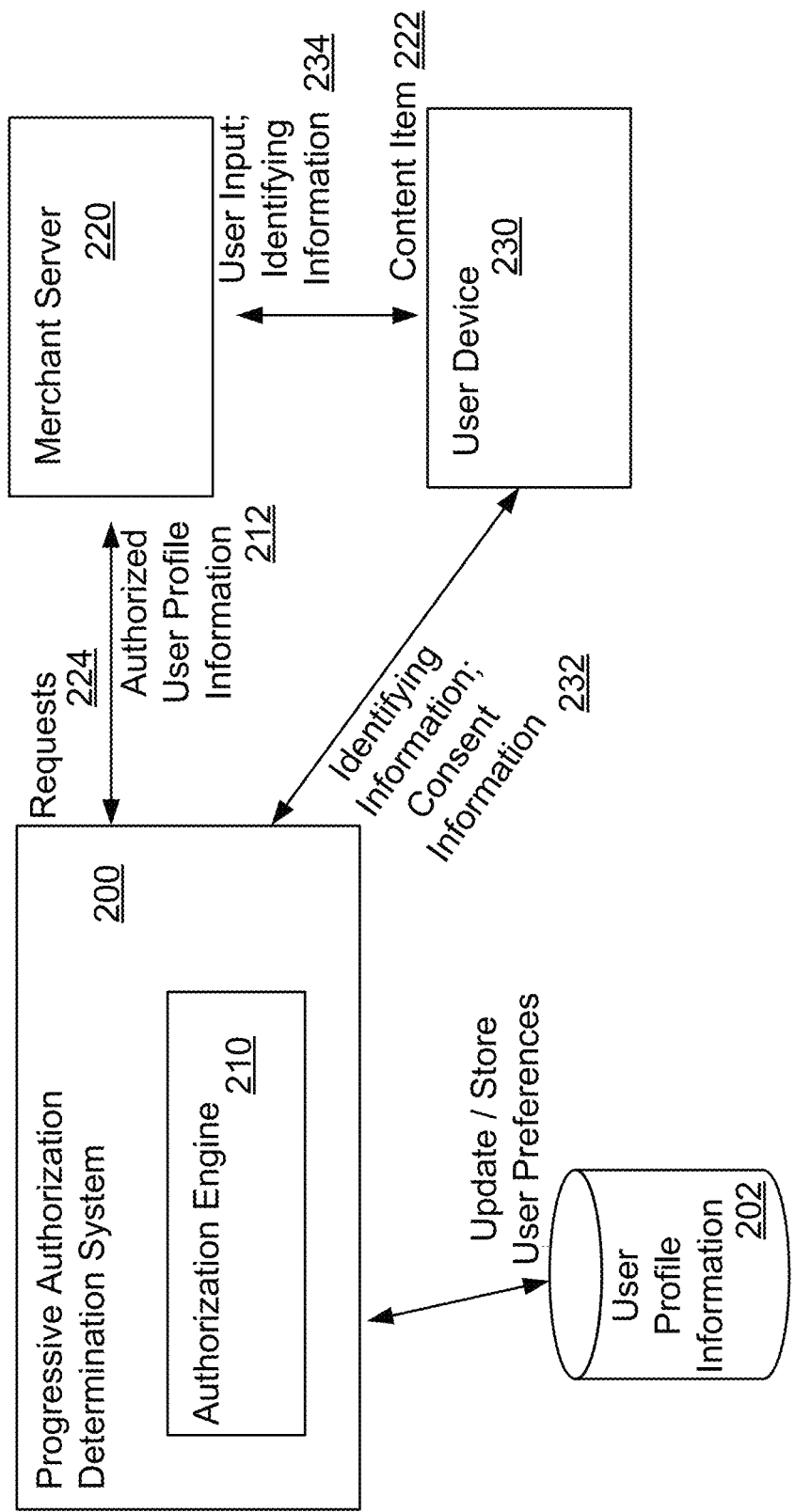
FIG. 2 illustrates an example block diagram of a progressive authorization determination system.

FIG. 2 illustrates an example block diagram of a progressive authorization determination system 200. As described above, the progressive authorization determination system 200 is in communication with one or more user devices (e.g., user device 230) and one or more merchants (e.g., merchant server 220), and can provide portions of user profile information 202 to the merchant server 220 based on receiving sufficient identifying information 232 from the user device 230. Optionally, the user device can provide the identifying information to the merchant server 220, which can relay the information to the progressive authorization determination system 200. The progressive authorization determination system 200 can be a system of one or more computers, or one or more virtual machines executing on a system of one or more computers, and can be in communication with the merchant server 220 and user device 230 over one or more networks (e.g., the Internet). The user device can include a computer, a laptop, a mobile device, a wearable device, a device associated with an intelligent personal assistant (e.g., a device that interacts with a user largely via speech input from the user and speech output from the intelligent personal assistant), and so on.

The progressive authorization determination system 200 can be in communication with a user profile information database 202 (e.g., one or more databases, or one or storage subsystems), and users can be associated with user accounts of the progressive authorization determination system 200. That is, users can register with the progressive authorization determination system 200 to create user accounts, and the progressive authorization determination system 200 can maintain user profile information of each user account in the database 202.

Optionally, the progressive authorization determination system 200 can confirm enrollment of the users in the techniques described herein, such that enrolled users authorize the providing of user profile information to merchant servers. Optionally, the progressive authorization determination system 200 can allow modification, by each user, of authorization levels associated with portions of user profile information of the user. For instance, a first user may prefer that merchant servers receive a first name of the first user upon limited identifying information (e.g., inclusion of a cookie associated with the first user on a user device), while a second user may prefer that merchant servers have access to the first name upon more detailed identifying information (e.g., biometric information, such as a thumbprint). Additionally, each may specify that (1) personally identifiable information, such as name, address, payment information, can be provided to merchant servers, while (2) user preference information cannot be provided to merchant servers.

Additionally, merchant servers can register with the progressive authorization determination system 200, and the progressive authorization determination system 200 can provide information to the merchant servers (e.g., user profile information), and receive information from the merchant servers (e.g., requests for user profile information), through use of one or more application programming interfaces (APIs) associated with the system 200. Optionally, the progressive authorization determination system 200 can monitor each registered merchant server, and determine risk information associated with the merchant server. For instance, the progressive authorization determination system 200 can increase risk (e.g., increase a risk score, which the system 200 can store, updated, and/or maintain) associated with a merchant server based on suspicious transactions being requested by the merchant server for implementation by the system 200 (e.g., the merchant server can request payment from users, and the system 200 can determine whether the requests are suspicious or not authorized by the users). In another instance, the progressive authorization determination system 200 can increase a risk (e.g., the risk score described above) associated with a merchant server based on complaints received from users regarding the merchant server or merchant, or information indicative of the merchant server improperly utilizing received user profile information (e.g., selling the user profile information), and so on. The progressive authorization determination system 200 can disconnect from merchant servers associated with risks (e.g., risk scores) greater than a threshold, such that the merchant servers are blocked from receiving user profile information.

The user device 230 can receive, for example, a content item 222 (e.g., a web page) from the merchant server 220, and can provide identifying information 232 to the progressive authorization determination system 200 (e.g., directly the system 200, for instance not via the merchant server 220). As an example, the content item 222 can include code associated with the system 200, and the code can cause detection of the identifying information 232, and providing of the identifying information 232 to the system 200. Optionally, for scenarios in which the user device 230 is a device associated with an intelligent personal assistant, the user device 230 can receive communication information from the merchant server 220, and can the user device 230 can provide identifying information 232 (e.g., speech from a user of the user device 230, a voice signature, voice print, of the user, and so on) to the progressive authorization determination system 200. Optionally, for user devices that are mobile devices or wearable devices, the user device can execute an electronic application (e.g., an 'app' downloaded from an electronic application store) that is associated with the merchant server 220, and the electronic application can provide identifying information 232 to the progressive authorization determination system 200 (e.g., a unique identifier associated with the user device, single sign-on information associated with the system 200, and so on). As described above, the user device can detect the identifying information 232, such as a cookie associated with a particular user, an identifier associated with the user device 230, and provide the identifying information 232 to the progressive authorization determination system 200.

The progressive authorization determination system 200 includes an authorization engine 210 that can determine a confidence (e.g., a confidence score, which the system 200 can store, update, and/or maintain) indicating a likelihood that a person operating the user device 230 corresponds to a particular user. For instance, particular pieces of identifying information can be associated with respective weights, and the weights can be combined (e.g., summed, averaged, summed and normalized, and so on), to obtain the confidence (e.g., confidence score). Additionally, the authorization engine 210 can utilize one or more machine learning models (e.g., clustering techniques, such as k-means clustering, trained on identifying information of users and associated labels indicating whether the users were properly identified) to determine the confidence (e.g., confidence score) based on the received identifying information 232.

Based on the determined confidence (e.g., confidence score), the authorization engine 210 can access the user profile information database 202 and obtain one or more portions of user profile information associated with authorization levels satisfied based on the determined confidence (e.g., confidence score). Additionally, a user of the user device 230 can specify preferences of information, or restrictions on information, that can be provided to the merchant server 230 (e.g., the user can access settings information, and indicate that merchants can receive particular portions of information), and the authorization engine 210 can enforce the preferences.

As described above, for instance with respect to FIG. 1E, the progressive authorization determination system 200 can also ensure that a user of the user device 230 has indicated or provided, consent to portions of user profile information 212 being provided to the merchant server 220. For example, the progressive authorization determination system 200 can store indications of consent with respect to portions of user profile information 212, and/or particular merchants. In this way, users can specify that a first merchant is able to receive portions of user profile information's, while a second merchant is able to receive portions of user profile information associated with lesser authorization thresholds. Additionally, as described above, the system 200 can determine risk information associated with merchants, and can provide information to users indicating risk information prior to the users indicating consent to merchant servers receiving user profile information. As described above, if the user of the user device 230 has not previously consented to the obtained portions of user profile information 212 being provided to the merchant server 220 (e.g., if the user has not indicated that the obtained portions can be provided to all merchants, merchants associated with risk scores less than a threshold, or to the particular merchant), the system 200 can prompt the user to indicate consent (e.g., user interface 180, as described above). If the user of the user device 230 does not indicate consent, the system 200 can provide information to the merchant server 220 rejecting the request 224. As illustrated in FIG. 2, the consent information 232 being provided between the system 200 and user device 230 can be solely between the system 200 and user device 230 (e.g., a separate channel can be utilized, optionally encrypted).

The progressive authorization determination system 200 can then provide the obtained portions of user profile information 212 to the merchant server 220 (e.g., through use of one or more APIs as described above), such as a first name of a user of the user device 230, user preferences of the user, default shipping and/or payment instruments (e.g., shortened descriptions of the shipping and/or payment instruments), and so on. Optionally, the system 200 can provide all portions of user profile information that are associated with authorization levels satisfied based on the determined confidence (e.g., confidence score), or the system 200 can provide particular an initial portion of user profile information (e.g., a first name), and can wait until receipt of requests for additional user profile information before providing other portions of satisfied user profile information (e.g., user preference information, shipping and/or payment defaults, and so on).

The merchant server 220 can provide requests 224 for user profile information to the progressive authorization determination system 200, for instance in response to user input 234 associated with, for example, the content item 222, or user input 234 associated with an intelligent personal assistant. As an example, the user input 234 may be indicative of a request for a particular type of product, and the merchant server 220 can provide a request for user profile information associated with the product (e.g., for clothing products, the merchant server 220 can request whether the user is interested in sports).

In response to receiving a request 224, the authorization engine 210 can determine whether the confidence that a person operating the user device corresponds to a particular user satisfies authorization levels associated with the requested user profile information. Upon a positive determination, the authorization engine 210 can access the requested user profile information, and provide the requested user profile information to the merchant server 220. Upon a negative determination, the authorization engine 210 can cause one or more prompts for additional identifying information to be provided on the user device 230, with the additional identifying information being sufficient to satisfy the authorization levels associated with the requested user profile information. That is, the authorization engine 210 can identify, or determine, additional identifying information that would satisfy the authorization levels.

Optionally, the authorization engine 210 can provide a portion, or all, of the user profile information as encrypted information (e.g., a blob of information) to the merchant server 220. The encrypted information can be encrypted such that it includes all user profile information the merchant server 220 may request in the future, with the encrypted information including multiple layers of encryption that can be peeled back as the confidence increases. For example, the authorization engine 210 can encrypt a first portion with an encryption key (e.g., a portion associated with a highest confidence). The system 200 can then add a layer over the encrypted portion with a second portion of profile information (e.g., a next most sensitive portion associated with a next highest confidence), and encrypt that with a second encryption key. The system can continue, such that all portions are wrapped over each other, with a least sensitive portion being at a highest layer. The encryption key for the highest layer (e.g., least sensitive portion) can be provided, and the information decrypted. As the confidence increases, additional encryption keys can be provided such that the next layer can be decrypted. In this way, latency associated with providing user profile information can be reduced, since the system 200 may only need to provide the single blob of encrypted information, and then provide individual encryption keys. Optionally, a third party outside system may be able to provide the encryption keys, such that the system 200 requires no further action after providing the blob of information.

As described above, with respect to FIGS. 1A-1D, as the user of the user device 230 navigates about the content item 222, or as the user of the user device initiates a check-out process, the progressive authorization determination system 200 can ensure that user profile information is provided, or utilized (e.g., payment information of the user utilized to effect the check-out process) on an 'as-needed' basis, and only upon the system 200 being sufficiently confident in the user identity of a person operating the user device.

Figure 3:
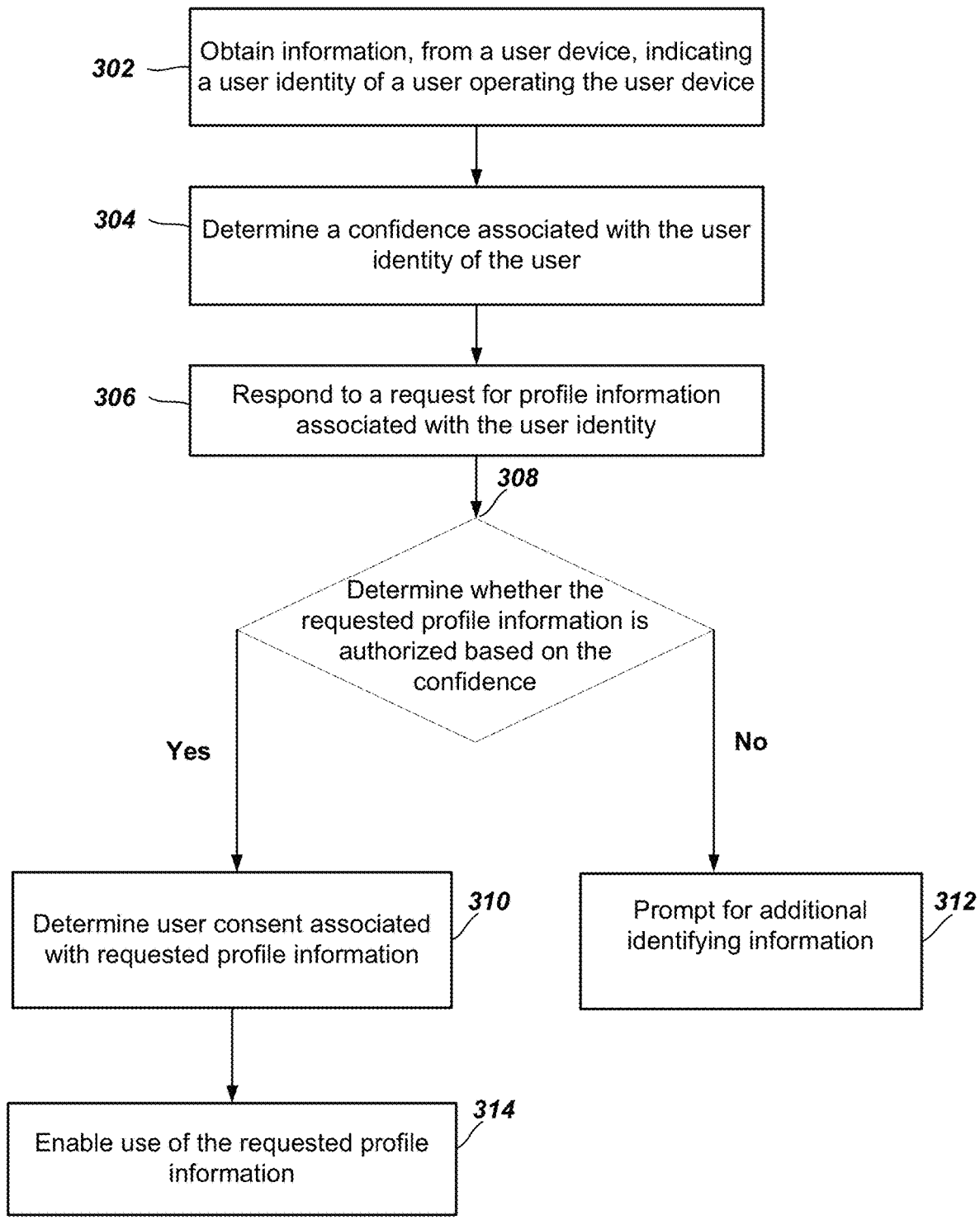
FIG. 3 is a flowchart of an example process for progressive authorization of information.

FIG. 3 is a flowchart of an example process 300 for progressive authorization of information. For convenience, the process 300 will be described as being performed by a system of one or more computers (e.g., the progressive authorization determination system 200). While the features of FIG. 3, for instance blocks 302-314, are indicated according to a particular order, the features can optionally be performed in any order. For example, block 306 directed to responding to requests for profile information can be performed initially (e.g., the system can obtain information indicating a user identity in response to a received request), and so on.

As described above, the system can provide user profile information of users to merchant servers (e.g., for use in customizing user experiences of content items, and reducing complexities associated with use of the content items, such as automatic presentation of products based on a user's interests, simplifying a check-out process, and so on), and the system can further utilize personally identifiable information to perform actions, such as utilizing payment information of users to implement transactions with the merchant servers. Since user profile information includes potentially sensitive or private information, the system can ensure that a confidence associated with a user identity of a person operating a user device exceeds a threshold prior to user profile information being provided or accessed.

The system obtains information from a user device indicating a user identity of a user operating the user device (block 302). As described above, the user device can present a content item (e.g., a web page) received from a server associated with, for example, a merchant. The content item can include code that causes the user device to detect identifying information to be provided to the system, and the code can identify to the server that (1) based on identifying information, a user operating the user device is enrolled or registered with the system (e.g., the user has an associated user account with the system), and (2) the server is to receive user profile information associated with the user from the system.

As described above, the user device can detect identifying information, such as a cookie associated with a user (e.g., a user account of the system) indicating that the user device has, at least in the past, been utilized by the user, unique identifiers associated with the user device (e.g., MAC address, UUID, GUID, and so on), location information of the user device (e.g., a location determined from an IP address associated with the user device or a global navigation satellite system receiver included in the user device), and so on.

After detecting the identifying information, the system can receive the identifying information, and determine a confidence associated with the user identity of the user (block 304). As described above, the system determines a likelihood that the identifying information is indicating a particular user (e.g., user account) associated with the system. For instance, the system can utilize the cookie information to determine that the user device was indeed utilized by an identified user. However, since the cookie only indicates past access and use by the identified user, the system can determine that the confidence is relatively low. The system can maintain a confidence score associated with the user, for instance the system can update the confidence score (e.g., the confidence score can be updated subsequent to the user accessing the content item, subsequent to or within a threshold amount of time of the user logging onto a laptop or accessing a mobile device, and so on), access a present confidence score, and so on.

To increase the confidence (e.g., confidence score), and as described above, the system can utilize other identifying information, such as an identifier associated with the user device. For instance, the system may store information indicating that the user device has been previously registered with the system (e.g., the system may have prompted an identified user to register the user device with the system, and the system can therefore have a greater confidence that the user device is specific to the identified user). Optionally, the user device may have been registered with the merchant server, and the system can increase the confidence as the identified user has previously indicated a level of authorization to the merchant server (e.g., indicated to the merchant server that the user device is to be utilized when accessing the merchant server).

Additional identifying information can include biometric information, for instance the user device may have received a thumbprint of a person operating the user device, and the system can determine, or receive from the user device, information indicating whether the thumbprint corresponds to a thumbprint of the identified user. Biometric information can further include a voice signature of a person operating the user device (e.g., the person may be conversing or providing speech to the user device, and the system, or user device, can determine whether the voice corresponds to a voice of the identifier user), typing speed or characteristics, mouse movement characteristics, and so on. Optionally, the user device can be in communication with a wearable device worn by the person operating the user device, and the system can receive biometric information as measured by the wearable device. For instance, the wearable device can determine a heartbeat associated with the person, and the user device, or system, can determine that the heartbeat corresponds to the identified user, and thus increase the confidence.

The system can further access user profile information of the identified user, and for instance obtain a phone number or email address of the identified user (e.g., two-factor authentication). The system can then contact the phone number (e.g., as a text message) or email address, and if a response is received confirming that the identified user is indeed accessing the merchant server, the confidence can be increased.

As described above, the system can utilize location information of the user device, and compare the location information to historical location information of the identified user. That is, the system can monitor location information of the user device, and identify locations associated with the identified user directly accessing the system (e.g., providing a user name, account, to the system), or optionally locations associated with the identified user where a determined confidence of the user's identity exceeds a threshold. In this way, if the identified user is commonly at a particular coffee shop, the confidence can be increased. The confidence can be modified according to a time the merchant server is being accessed, for instance if the identified user is known to be at the particular coffee shop within a general period of time, or within one or more standard deviations from a mean, the system can increase the confidence.

The system responds to a request for user profile information associated with the identified user (block 306). As described above, subsequent to receiving identifying information and determining a confidence (e.g., confidence score), the system can access user profile information, and provide a portion of the user profile information to the merchant server. Furthermore, and as described above, the system can obtain identifying information, determine a confidence, subsequent to the received request. Portions of the user profile information can be associated with different authorization levels, and access to the different authorization levels can be predicated on the determined confidence (e.g., confidence score) exceeding respective thresholds. For instance, access to personally identifiable information can be associated with a high authorization level, while access to a first name can be associated with a low authorization level.

Optionally, upon initially receiving identifying information and determining the confidence, the system can provide user profile information associated with authorization levels satisfied based on the determined confidence to the merchant server That is, if the confidence enables access to user profile information including a (1) first name, (2) user preference information (e.g., user preference information associated with products of the merchants), the system can provide the first name and user preference information without receiving a request from the merchant server. Optionally, the system can provide just the first name, and provide other user profile information upon receiving requests for the user profile information.

As an example of a request, the system can receive a request for user preference information related to products of the merchant, or the system can receive a request for specific information related to particular classes of products, interests identified in the user preference information (e.g., whether the identified user likes sports, types of sports, teams, and so on), and the system can provide the requested information upon determining that the confidence enables access to the requested information.

As another example of a request, the system can receive a request to initiate a check-out process, for instance as illustrated in FIG. 1C, disparate steps of the check-out process can be associated with different portions of user profile information. For example, the system can receive a request for default shipping and payment information of the identified user, and the system can provide a shortened (e.g., sanitized, so as to remove personally identifiable information) version of the default shipping and payment information. The system can then receive a request to complete the transaction as a payment service, and the system can access payment information of the identified user upon sufficient receipt of identifying information from the user device (e.g., entry of a password associated with the user identified user, confirmation of biometric information, and so on).

The system determines whether the requested user profile information is authorized to be accessed based on the determined confidence (block 308). As described above, the system can determine whether the confidence (e.g., confidence score) satisfies authorization levels associated with the requested user profile information.

Upon a positive determination, the system enables access or use of the requested user profile information (312), and upon a negative determination, the system causes prompts to be provided (block 314) (e.g., presented, outputted as speech, and so on) from the user device that request additional identifying information. For example, as described above, and as illustrated in FIG. 1C with respect to user interface 150, a prompt can request a password associated with the identified user.

Prior to enabling user, access, of requested profile information, the system can determine whether the user has consented to the requested profile information being provided (block 310). For instance, as described above with respect to FIG. 1E, the system can determine whether the user has previously indicated that the requesting merchant can receive profile information (e.g., the requested profile information, or profile information associated with a greater authorization level than the requested profile information), or has indicated a general consent to merchants (e.g., all merchants, merchants associated with risks less than a threshold) receiving the requested profile information. If the user has not so consented, the system can prompt the user for consent (e.g., as illustrated in FIG. 1E). Optionally, even if the user has previously consented to the merchant receiving the requested profile information, the system can prompt the user for consent after a threshold period of time (e.g., one week, two weeks, one month, and so on).

Vending Machine

The techniques described herein can be utilized in conjunction with vending machines that are connected via one or more networks (e.g., the Internet) to a merchant server associated with the vending machines (e.g., a vending machine network). As will be described, the vending machines can utilize the system 200 to effect payment from users of the vending machines through use of a payment service associated with the system. For instance, in contrast to requiring a user of a vending machine to directly provide payment information (e.g., requiring the user to swipe a physical card on the vending machine), the vending machine can be associated with a payment service of the system, and the user can confirm payment through use his/her mobile device (e.g., the user can interact with an application executing on the mobile device to confirm payment to a merchant associated with the vending machine, such as through placing his/her thumbprint on a thumbprint reader of the mobile device).

Figure 4:
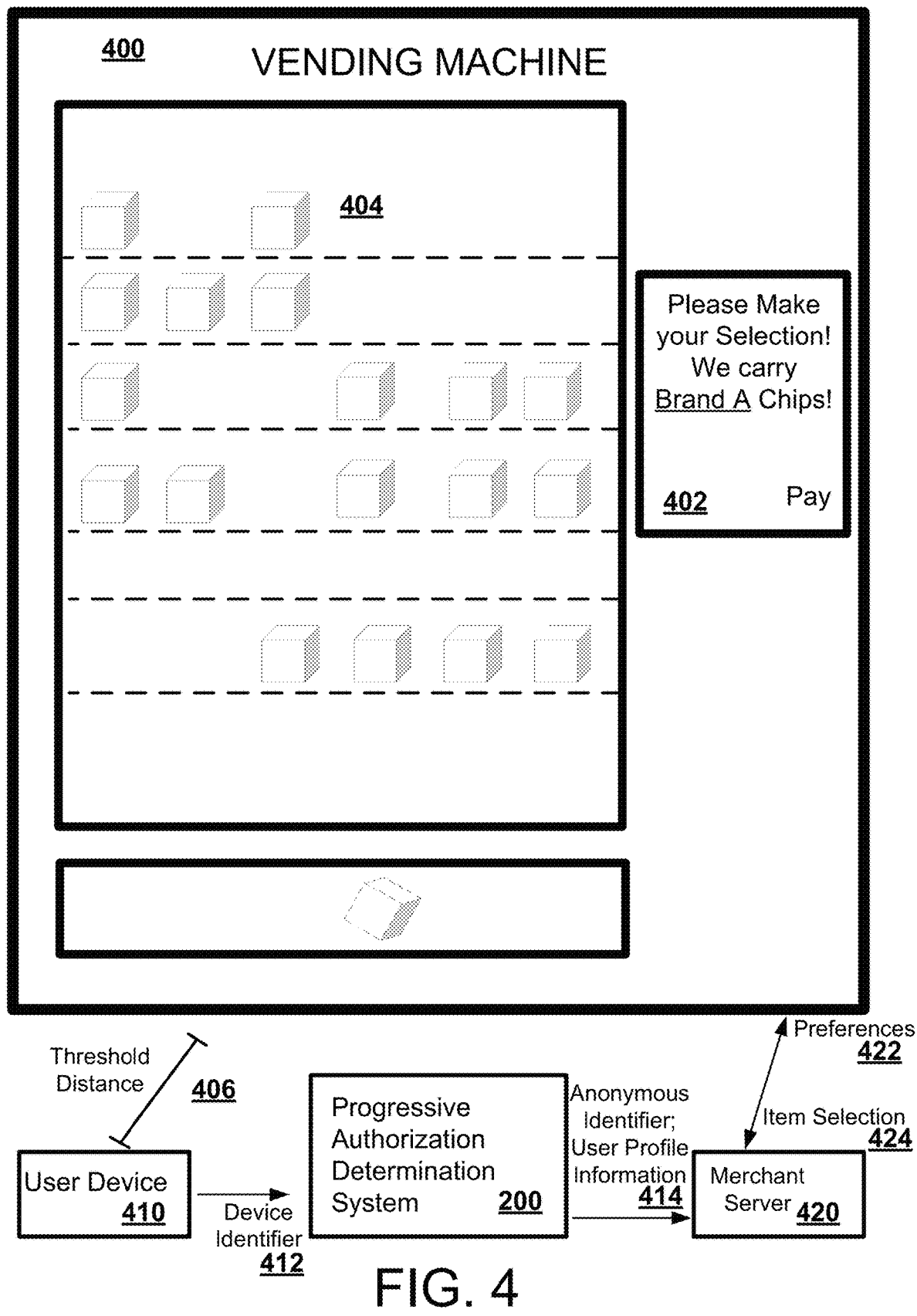
FIG. 4 is a block diagram of an example vending machine in communication with other systems.

FIG. 4 illustrates an example vending machine/kiosk 400. As illustrated, the example vending machine 400 includes a display 402 (e.g., as will be described, the display can receive information from one or more processors of the vending machine 400, and can present information to users of the vending machine), and carries items 404 available for purchase. Furthermore, the vending machine 400 is in communication with a merchant server 420 via one or more networks (e.g., the Internet), such that the vending machine 400 can provide information to, and receive information from, the merchant server 420. The vending machine can include one or more motors that are controlled by the processor(s) and that drive a product dispensing apparatus, for instance an apparatus that can travels to a location of a product, receives it, and provides the product to an output (e.g., an output chute, port, and so on), or an apparatus that pushes a product out of a holder, and via gravity causes the product to fall into an output receptacle. Additionally, the vending machine can include a currency validator to receive an input of money, such as bills, coins, and so on.

Further description of vending machines/kiosks, providing products from kiosks, interacting with vending machine/kiosks (e.g., projectors, displays, and so on), monitoring products, is included in U.S. Pat. No. 9,141,9321 titled "INVENTORY DISTRIBUTION METHOD AND SYSTEM"; U.S. Patent App. 2010/0268792 titled "VENDING MACHINE WITH INTERACTIVE DISPLAY"; U.S. Patent App. 2006/0241965 titled "VENDING MACHINE SYSTEM AND METHOD FOR ENCOURAGING THE PURCHASE OF PROFITABLE ITEMS"; U.S. Patent App. 2015/0019391 titled "DETECTING ITEM INTERACTION AND MOVEMENT"; U.S. Patent App. 2015/0012396 titled "TRANSITIONING ITEMS FROM A MATERIALS HANDLING FACILITY"; each of which are hereby incorporated by reference in their entirety for all purposes. For example, particular embodiments described in U.S. Patent App. 2015/0012396 and U.S. Patent App. 2015/0019391 with respect to the projectors 210 and/or displays 212, can optionally be utilized, or function, as the display 402. As an example, display 402 can be a touch-sensitive display, as described in the above-recited incorporated references.

When a user of a user device 410 (e.g., a mobile device, a wearable device) approaches the vending machine 400, the vending machine 400 can determine when the user device 410 is within a threshold distance 406 of the vending machine 400, for instance 0.5 feet, 1 foot, 2 foot, and so on, indicating that a user of the user device 410 is likely to interact with the vending machine 400 or is likely to be interested in perusing the carried items 404. For instance, the vending machine 400 can include one or more sensors, such as Bluetooth beacons that can determine distances of user devices from the beacons, or other sensors such as stereo cameras (e.g., the stereo cameras can determine a depth from the cameras to users), Lidar, Leddar, Sonar, and so on.

As described above, the sensors can include near field communication sensors (NFC). Additionally, other means for short-range inter-device communication may also be utilized in accordance with the systems and methods of the present disclosure. Such compatible technologies include, but are not limited to, induction wireless, infrared wireless (such as technologies operating according to specifications and protocols provided by the Infrared Data Association, or IrDA) or ultra wideband formats. In some embodiments, the devices may utilize short-range, low-power and high-frequency radio transmissions, such as Bluetooth®. In still other embodiments, the devices may support acoustic-based data transfer. For example, one device may include software components and a speaker that enable the device to broadcast data to another device as sound waves, while the other device may include software components and microphone that enable the second mobile device to receive the data embedded in the sound waves. Thus, one or more of radio signal-based data transfer (e.g., NFC or Bluetooth®), light-based data transfer (e.g., infrared data transfer), an acoustic-based data transfer (e.g., sound wave-embedded data), or magnetic field-based transfer may be used for inter-device communication.

Upon determining that the user device 410 is within the threshold distance 406, the vending machine 400 can provide information to the user device 410 (e.g., provide information over wireless communications, such as via Bluetooth, Wi-Fi, and so on), that triggers an application executing on the user device 410. Optionally, prior to providing information, the vending machine 400 can ensure that the user device 410 has been within the threshold distance 406 for a threshold amount of time, and optionally that the user device 410 is not moving laterally greater than a threshold distance within the amount of time (e.g., a user of the user device 410 may be moving slowly from a first side of the vending machine 400 to the opposite side of the vending machine 400, with no intention of purchasing items 404).

The information provided to the user device 410 can be packaged, formatted, and so on, according to an operating system of the user device 410. That is, the vending machine can query the user device 410 to identify itself, and receive an acknowledgement that includes information indicative of an operating system type. The vending machine 400 can then provide information to the user device (e.g., using one or more APIs of the operating system type) that is usable by the user device to trigger an application associated with the progressive authorization determination system 200.

Upon triggering of the application, the application can provide a unique identifier 412 associated with the user device 410 to the system 200, such as a MAC address, an identifier assigned by the system 200 to the user device 410 (e.g., maintained by the application executing on the user device 410, a UUID, and so on). The system 200 can utilize the unique identifier 412 to access user profile information, and can optionally ensure that the user device 410 has not been reporting missing or stolen (e.g., the system can determine that a confidence of the user device 410 being operated by a proper user exceeds a threshold).

As described above, the system 200 can determine a confidence associated with a user operating the user device 410, which can be based on monitored actions of the user with respect to the user device 410 (e.g., the application executing on the user device can provide information indicating that the user has applied his/her thumb to a thumbprint reader, that the user has logged into the application within a threshold amount of time, or since the user device has been located within a threshold distance of the vending machine, and so on). Additionally, the user device 410 can monitor a gait associated a person operating the user device 410 (e.g., as the user device is being carried around, the user device can determine whether the gait corresponds to a gait associated with a person that owns the user device 410).

The system 200 can access the user profile information associated with the unique identifier 412, and can determine an anonymized identifier 414 assigned to the user profile information (e.g., a GUID). That is, the system can maintain anonymized identifiers 414 that uniquely correspond to particular users, but that do not include any personally identifiable information. The system 200 can then provide the anonymized identifier 414 to a merchant server 420. The anonymized identifier 414 can be utilized, for instance, upon the determined confidence being below a particular authorization threshold, such that no personally identifiable information is provided to the merchant server 420. Optionally, if the determined confidence exceeds the particular authorization threshold, a name associated with a user of the user device 410 can be provided to the merchant server 420. Similarly, if the determined confidence exceeds an authorization threshold (e.g., the particular authorization threshold, a higher authorization threshold), the system 200 can provide user profile information 414 to the merchant server 420, such as product preferences, product history, and so on (e.g., as described above). For instance, subsequent to the user purchasing a product, the merchant server 420 can provide information identifying the product, or the system 200 can determine an identity of the product when performing the payment transaction. The system 200 can therefore store information obtained from multitudes of vending machines, and provide portions of the stored information to the merchant server 420. Additionally, and as will be described further below, if the vending machine 400 is a ticket machine (e.g., a train ticket, a subway ticket, and so on), the system 200 can provide information indicating a location of travel that the user is likely to take (e.g., based on historical purchases, based on map information maintained on the user device indicating a home address, and so on). In this way, the vending machine 400 can simply prompt the user if he/she wishes to purchase a ticket home, to work, and so on.

To determine the merchant server 420 associated with the vending machine 400, when triggering the application on the user device 410, the vending machine 400 can optionally uniquely identify itself to the user device 410, such as through providing a registry code, or other identifying information, associated with a short-range device, Bluetooth beacon. The system 200 can analyze the registry code, and identify the merchant server 420 through use of the registry code (e.g., the system 200 can maintain mappings of codes to merchant servers, or the system 200 can query merchant servers until identifying the merchant server 420). Optionally, when providing information to the user device 410, the vending machine 400 can further provide information to the merchant server 420 directly, and the merchant server can indicate to the system 200 that a user located adjacent to the particular vending machine 400 has been determined to be utilizing the vending machine 400, and the system 200 can correlate the particular vending machine 400 with a user device (e.g., the system 200 can determine that, based on a timing of receipt of device identifiers from user devices, and/or location of user devices, a particular user device that is interacting with the vending machine 400).

The merchant server 420 can receive the anonymous identifier 414, or optionally user profile information 114, and access maintained information indicating preferences 422 associated with the anonymous identifier 414 and/or name identified in the user profile information 414. For instance, the preferences 422 can indicate item preferences, such as favorite chips or cookies of the user, and the merchant server 420 can provide the preferences 422 to the vending machine 400. The merchant server 420 can customize the preferences 422 according to items being carried by the vending machine. For instance, the merchant server 420 can obtain information identifying items carried by the vending machine 400 (e.g., the server 420 can query the vending machine 400, or access information identifying items included in machines 400), and can provide preferences 422 solely related to those carried items.

Upon receipt of the preferences 422, the vending machine 400 can update the display 402 to present useful information to the user of the user device 410, such as the fact that a particular item is being carried. Optionally, in addition to the anonymous identifier 414, if the system 200 provided a first name of the user of the user device 410 to the merchant server 420, the vending machine 400 can further present the first name in the display 402 (e.g., 'Hello Jane, we carry [item brand]'). Optionally, the vending machine 400 can include information in the display 402 to enable the user to easily purchase a recommended item, such as ('We carry [item brand], please select pay to receive this item'). In this way, a 'one-touch' can be provided to the user, such that the user's preferred item can be provided to the user with limited, and less, user interaction than usual (e.g., decreasing complexity associated with use of vending machines).

Once the user has made a selection of an item 424, the user can interact with the vending machine 400 to purchase the selected item 424. For instance, the user can interact with a 'pay' button, and can provide payment information (e.g., swiping of a payment instrument, direct entry of cash or coins), or the user can interact with the user device 410 to provide the payment information. As an example, upon interacting with the pay button, the user device can be triggered to present an application associated with the system 200, and the user can confirm payment via the application. As described above, confirming payment is associated with access to user profile information at a high authorization level. Thus, the application can require the user to enter a password, place his/her thumbprint or finger on a reader, verbally confirm the payment, enter a pin code, and so on. The system 200 can then process the payment information, and indicate to the merchant 420 that payment has been successfully processed, and the merchant 420 can provide information to the vending machine 400 confirming payment, such that the vending machine 400 can output the selected item 424.

The merchant server 420 can update information associated with the anonymized identifier 414 and/or user profile information 414, to inform preferences 422 associated with a user of the user device 410.

Via the techniques described herein with respect to the vending machine/kiosk, a situation in which a customer has not interacted with a vending machine prior. That is, the vending machine can easily obtain preference information of the customer, and present the information to enable the customer to make a quicker and more informed purchasing decision.

Figure 5:
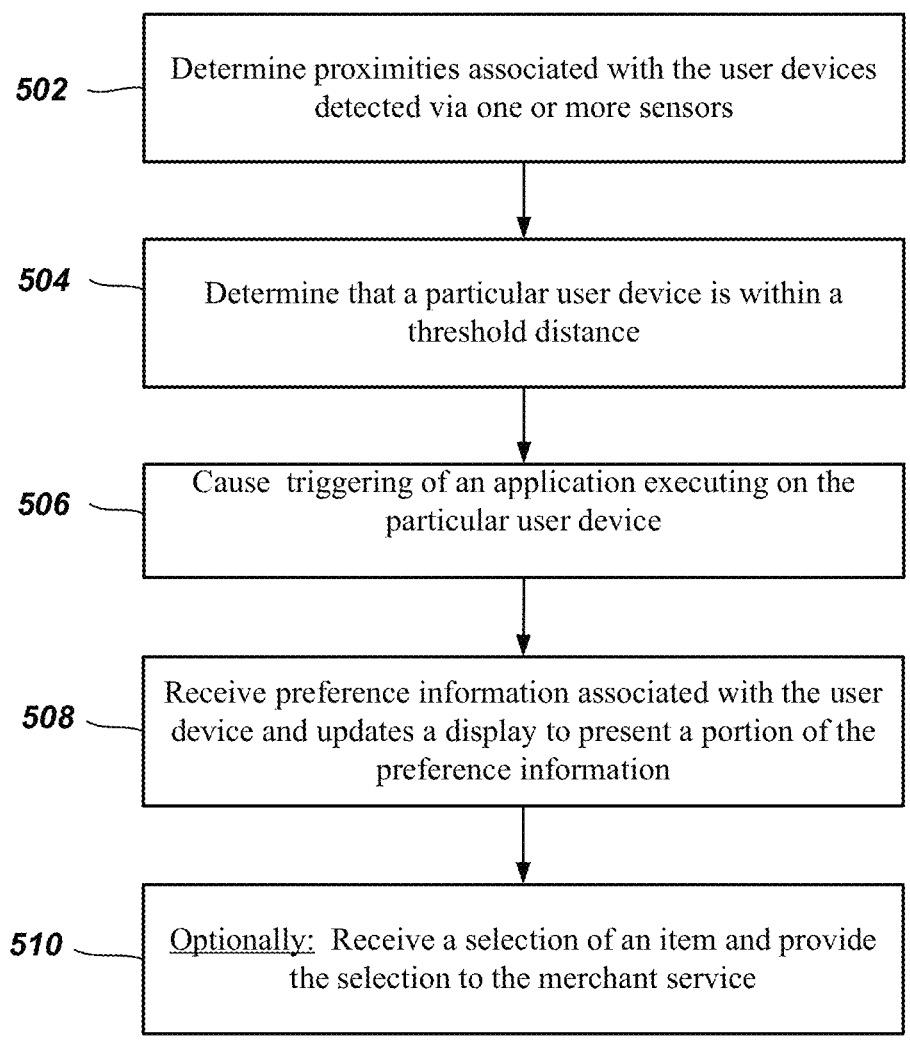
FIG. 5 is a flowchart of an example process for proving a selected item to a user of a vending machine

FIG. 5 is a flowchart of an example process for proving a selected item to a user of a vending machine. For convenience, the process 500 will be described as being performed by a vending machine of one or more processors (e.g., a vending machine 400 that includes one or more processors, one or more computer storage media storing instructions configured for execution by the processors, one or more displays, one or more sensors, and which can be connected to one or more networks).

The vending machine determines proximities associated with the user devices detected via one or more sensors (block 502). As described above, the vending machine can utilize short-range devices, Bluetooth sensors (e.g., a Bluetooth beacon) to detect proximities with user devices.

The vending machine determines that a particular user device is within a threshold distance (block 504). As described above, the vending machine can determine that the particular user device is within the threshold distance, and optionally within the threshold distance for greater than a threshold amount of time.

The vending machine causes triggering of an application executing on the particular user device (block 506). As described above, the vending machine can provide information to the particular user device that causes a triggering of an application associated with a system (e.g., the system 200). Additionally, the vending machine can provide an identifier associated with the vending machine, and the application can provide (1) the identifier associated with the vending machine, and (2) an identifier associate with the user device, to the system.

The vending machine receives preference information associated with the user device and updates a display to present a portion of the preference information (block 508). As described above, the vending machine can receive preference information from a merchant server over one or more networks (e.g., the Internet), with the preference information being maintained by the merchant server and associated with an anonymized identifier assigned to the user device. The vending machine can utilize the preference information to determine a ranking of the items it carries, and can update the display to indicate one or more carried items according to the ranking.

The vending machine optionally receives a selection of an item and provides the selection to the merchant server (block 510). Upon receiving a selection of an item, the vending machine can provide the selection to the merchant server, such that the preference information maintained by the merchant server can be updated.

The description above, with respect to FIGS. 4-5, described providing user profile information to a merchant server, based on a determined confidence of a user identity exceeding one or more authorization thresholds. As described above, with respect to at least FIG. 1E, the system 200 can further ensure that the user indicated consent prior to providing user profile information, and can optionally prompt the user to indicate consent (e.g., the system 200 can provide information to the user via the user's user device).

Additional Embodiments

In addition to the vending machine (e.g., vending machine 400) interacting with a user device (e.g., user device 410), and the progressive authorization determination system 200 providing an anonymous identifier, or user profile information 414, to a merchant server (e.g., merchant server 420), the vending machine can interact with a user via voice commands (e.g., the vending machine can be associated with an intelligent personal assistant, as described above).

As an example, a user can approach the vending machine and audibly provide verbal commands or statements, for instance in response to the vending machine detecting that the user is within a threshold distance of the vending machine. The user can identify himself/herself (e.g., 'Hi, I'm [first name]), and the vending machine can provide information to the system 200 (e.g., audio of the user) usable by the system 200 to identify the user. The system 200 can perform a voice printing process, and identify the user associated with the voice (e.g., the system 200 can filter available people based on the first name, full name, or other identifying information provided by the user, and then match the received audio with a voice of a remaining user). In addition to providing audio of the user, the vending machine can have one or more cameras, and can provide images or video of the user to the system 200 for processing. Utilizing facial recognition algorithms (e.g., eigenface, algorithms based on deep learning techniques, SIFT feature detection algorithms, and so on) the system 200 can increase a confidence associated with an identity of the user. Similarly, the vending machine can provide information to a user device being carried by the user, and if the user device is identified (e.g., based on MAC address, GUID, UUID) as one associated with the user (e.g., the user identified by the voice and/or images), the system 200 can increase a confidence.

Based on a determined confidence associated with an identity of the user, the system 200 can provide user profile information to the vending machine (e.g., via a merchant server, as illustrated in FIG. 4), and the vending machine can inform the user that it carries particular items, or request whether the user wants to travel home, to work, and so on. For instance, subsequent to the user saying ('Hi, I'm [first name]'), the vending machine can seamlessly then respond with a follow-up statement such as, ('do you want a ticket home?'). For instance, the vending machine may be located away from the user's home, and therefore the user may be at the vending machine to purchase a train ticket home. The system 200 can maintain address information associated with the user, and can provide, for example, an indication to the merchant server that based on a location of the vending machine, the user is likely going to travel home. The system 200 can avoid providing the specifics of the user's address to the vending machine, instead merely providing an indication to use the word "home," or some other shortened form of a particular address (e.g., as in FIG. 1C with respect to 'Seattle-home." Optionally, the system 200 can determine a closest stop to the user's home, work, and so on, and can provide an indication of the closest stop to the merchant server. Similarly, if the vending machine sells products, the vending machine can provide a statement such as "do you want [brand A chips?].

If the user wants payment information to be processed by the system 200 (e.g., purchase a ticket, product, and so on), the user can, as an example, provide a statement such as 'yes,' 'I do want a [ticket or product]', and so on. The system 200 can receive this statement, and determine whether a confidence associated with the identity of the user is greater than an authorization threshold associated with payment. If so, the system 200 can process the payment, and provide information to the merchant server confirming payment, and the vending machine can output the requested ticket or product. If the determined confidence is below the authorization threshold, the system 200 can cause the vending machine to prompt the user to provide a particular word, pass code, pin number (e.g., entered on a display of the vending machine), biometric information (e.g., thumbprint on a reader of the vending machine, or reader on a user device of the user which can be provided to the system 200), and so on, that will increase the confidence to greater than the authorization threshold. For example, the vending machine may provide the statement, 'please provide a passcode', and the user can speak the passcode which can be confirmed by the system 200. The user can previously specify a particular word, series of words, song, whistled tune, and so on, to the system 200, and the system 200 can store the specified information to confirm the user's identity.

Furthermore, in addition to the above description of vending machines, the techniques described herein can be applied to other scenarios. For instance, a user entering a store can have his/her user device triggered by systems included in the store (e.g., as described above, with respect to FIG. 4, utilizing short-range devices, Bluetooth beacons, user devices can be recognized and applications executing on user devices triggered). The user device can then provide information to the user indicating that a product the user was recently searching for is included on a particular aisle.

Embodiments of the disclosure can be described in view of the following clauses:

Clause 1. A method comprising:
by a system of one or more computers,
monitoring identifying information, obtained from a user device over a first network connection, indicative of whether a particular user is operating the user device, wherein the user device detects the identifying information and accesses a content item associated with a content server;
determining, based on the identifying information, a confidence associated with the user device being operated by the particular user;
accessing profile information associated with the particular user, and enabling access, by the content server over a second network connection, of profile information that is associated with an authorization threshold satisfied based on the determined confidence;
receiving, based on one or more user actions associated with the content item, a request for profile information associated with an authorization threshold greater than the satisfied authorization threshold; and
determining whether the determined confidence satisfies the greater authorization threshold,
if the determined confidence satisfies the greater authorization threshold, enabling access, by the content server, to the requested profile information, and
if the determined confidence does not satisfy the greater authorization threshold, causing the user device to provide one or more prompts for additional identifying information, the additional identifying information enabling access, by the content server, to the requested profile information.

Clause 2. The method of clause 1, wherein the one or more user actions associated with the content item comprise actions that trigger use of personally identifiable information associated with the particular user, or actions that trigger use of preference information associated with the particular user, the preference information being usable by the content server to customize the content item for the particular user.

Clause 3. The method of clause 2, wherein profile information associated with a first authorization threshold includes one or more of a first name of the particular user or a shortened address of the particular user, and wherein profile information associated with a greater authorization threshold includes personally identifiable information of the particular user or preferences associated with the particular user.

Clause 4. The method of clause 3, wherein authorization thresholds associated with profile information are indicated based on access rights specified by the particular user.

Clause 5. The method of clauses 1 to 4, wherein detecting identifying information comprises one or more of, detecting a cookie associated with the system on the user device, detecting biometric information associated with a user operating the user device, detecting location information of the user device, or detecting an identifier associated with the user device.

Clause 6. The method of clauses 1 to 5, wherein determining a confidence associated with the user device is based on comparisons between (1) detected biometric information and stored biometric information associated with the particular user, (2) detected location information and stored location information indicating historical locations of the particular user, or (3) the detected identifier associated with the user device and identifiers of one or more user devices indicated, by the particular user, as being solely associated with the particular user.

Clause 7. The method of clause 6, wherein the identifiers of user devices indicated as being solely associated with particular user are further indicated as being user devices authorized, by the particular user, for use with the content server.

Clause 8. The method of clauses 1 to 7, wherein the content item includes a widget associated with use of personally identifiable information by the system, and wherein the request for profile information is received from the user device in response to user actions associated with a presented widget.

Clause 9. The method of clause 8, wherein the widget comprises code included in the content item that enables direct communications between the user device and system.

Clause 10. The method of clauses 1 to 9, further comprising:
prior to enabling access to the requested profile information, determining that the particular user has consented to the requested profile information being accessed by a merchant associated with the content server, and wherein in response to determining that the particular user has not consented, causing the user device to provide one or more prompts for consent.

Clause 11. The method of clauses 1 to 10, wherein causing the user device to provide one or more prompts comprises providing information to the user device or the content server to present a prompt associated with input of biometric information, a prompt for input of personally identifiable information, or a prompt for input of responses to challenge questions.

Clause 12. The method of clauses 1 to 11, wherein determining whether the determined confidence satisfies the greater authorization threshold comprises:

obtaining updated identifying information from the user device, the updated identifying information reflective of user interactions with the content item; and updating the confidence based on the updated identifying information, wherein determining whether the determined confidence satisfies the greater authorization threshold is based on the updated confidence.

Clause 13. A method comprising:

by a system of one or more computers, obtaining information, from a user device, indicating a user identity of a user operating the user device, the user device being in communication with a content server, and the content server hosting interactive content of a merchant;

determining, based on the obtained information, a confidence associated with the user identity of the user; and responding to one or more requests, from the content server, for profile information associated with the user identity, wherein responding comprises:

determining whether the requested profile information is associated with an authorization level satisfied based on the determined confidence, and if the determined confidence satisfies the greater authorization threshold, enabling use, by the content server, of the requested profile information, and if the determined confidence does not satisfy the greater authorization threshold, causing the user device to provide one or more prompts by the user device for additional identifying information, the additional identifying information enabling increase of the determined confidence, and enabling use, by the content server, of the requested profile information based on the increase.

Clause 14. The method of clause 13, wherein the user device is associated with an intelligent personal assistant that interacts with the user, and wherein the obtained information indicating a user identity of the user includes one or more of voice information of the user or location information of the user device.

Clause 15. The method of clauses 13 to 14, wherein the user device is associated with an intelligent personal assistant that enables communications between the user and the merchant, and wherein a request, from the content server, for profile information includes a request for preferences associated with the user identity or a request associated with personally identifiable information of the user identity.

Clause 16. The method of clauses 13 to 15, wherein the user device presents a content item received from the content server, and wherein the content item is customized according to requested profile information associated with the user identity.

Clause 17. The method of clause 16, wherein the obtained information indicating a user identity of the user includes one or more of a cookie associated with the system on the user device, biometric information associated with the user, location information of the user device, or an identifier associated with the user device.

Clause 18. The method of clauses 13 to 17, wherein enabling use, by the content server, of requested profile information comprises one or more of (1) providing the requested profile information to the content server or (2) causing implementation of one or more actions, by the system, using the requested profile information, the actions being indicated by the content server in a request.

Clause 19. The method of clause 18, wherein an action indicated by the content server in a request comprises a request for utilization of payment information, by the system, that is associated with the user identity.

Clause 20. Non-transitory computer storage media storing instructions that when executed by a system of one or more computers, cause the system to perform operations comprising:

obtaining information, from a user device, indicating a user identity of a user operating the user device, the user device being in communication with a content server, and the content server interacting on behalf of a merchant with the user;

determining, based on the obtained information, a confidence associated with the user identity of the user; and responding to one or more requests, from the content server, for profile information associated with the user identity, wherein responding comprises:

determining whether the requested profile information is associated with an authorization level satisfied based on the determined confidence, if the determined confidence satisfies the greater authorization threshold, enabling use, by the content server, of the requested profile information, and if the determined confidence does not satisfy the greater authorization threshold, causing the user device to provide one or more prompts by the user device for additional identifying information, the additional identifying information enabling increase of the determined confidence, and enabling use, by the content server, of the requested profile information based on the increase.

Clause 21. A method comprising:

by a system of one or more computers, receiving identifying information associated with a user device, the identifying information being received in response to the user device being within a threshold distance of a vending machine, wherein one or more sensors included in the vending machine trigger the user device to provide the identifying information to the system;

accessing a portion of profile information associated with the user device, the portion of profile information indicating at least a unique identifier assigned to the user device;

providing the portion of profile information to one or more servers configured to communicate with the vending machine via one or more networks; and causing presentation, via a display of the vending machine, of preference information, maintained by the one or more servers, that is associated with the unique identifier.

Clause 22. The method of clause 21, wherein the identifying information is received from an application executing on the user device that is associated with the system.

Clause 23. The method of clause 22, wherein the application executing on the user device is triggered by the one or more sensors.

Clause 24. The method of clause 23, wherein the one or more sensors comprise short-range communication devices.

Clause 25. The method of clauses 21 to 24, wherein the unique identifier represents an anonymous identifier associated with the user device.

Clause 26. The method of clauses 21 to 25, wherein the identifying information is received in response to (1) the user device being within the threshold distance and (2) completion of one or more user actions on the user device confirming that the user device is to provide the identifying information.

Clause 27. The method of clause 26, wherein a completed user action includes the user device confirming biometric information of a user operating the user device.

Clause 28. The method of clauses 21 to 27, further comprising:
receiving, from the user device, identifying information associated with the vending machine, the identifying information being provided, by the vending machine, to the user device.

Clause 29. The method of clause 28, wherein providing the portion of profile information to the vending machine comprises:
identifying, based on the received identifying information associated with the vending machine, the one or more servers in communication with the vending machine; and providing the portion of profile information to the one or more servers.

Clause 30. Non-transitory computer storage media storing instructions that when executed by a system of one or more computers, cause the system to perform operations comprising:
receiving identifying information associated with a user device, the identifying information being received in response to the user device being within a threshold distance of a vending machine, wherein one or more sensors included in the vending machine trigger the user device to provide the identifying information to the system;
accessing a portion of profile information associated with the user device, the portion of profile information indicating at least a unique identifier assigned, by the system, to the user device;
providing the portion of profile information to one or more servers in communication with the vending machine via one or more networks; and
causing presentation, by the vending machine via a display of the vending machine, of preference information, maintained by the one or more servers, that is associated with the unique identifier.

Clause 31. The computer storage media of clause 30, wherein the identifying information is received from an application executing on the user device that is associated with the system.

Clause 32. The method of clause 31, wherein the application executing on the user device is triggered by one or more short-range communication devices.

Clause 33. The computer storage media of clauses 30 to 32, wherein the unique identifier represents an anonymous identifier associated with the user device.

Clause 34. The computer storage media of clauses 30 to 33, further comprising:
receiving, from the user device, identifying information associated with the vending machine, the identifying information being provided, by the vending machine, to the user device.

Clause 35. The computer storage media of clause 34, wherein providing the portion of profile information to the vending machine comprises:
identifying, based on the received identifying information associated with the vending machine, the one or more servers in communication with the vending machine; and
providing the portion of profile information to the one or more servers.

Clause 36. A vending machine comprising:
a display;
one or more sensors;
one or more processors; and
one or more computer storage media,
wherein the computer storage media store instructions that when executed by the one or more processors, cause the one or more processors to perform operations comprising:
determining proximities associated with user devices detected via the one or more sensors;
determining, for a particular user device, that a determined proximity is less than a threshold;
causing, based at least in part on the determination that the determined proximity is less than the threshold, triggering of an application executing on the particular user device, and wherein the application provides identifying information of the particular user device and vending machine to an outside system over one or more networks; and
receiving preference information associated with the particular user device, and updating the display to present at least one selectable option associated with the preference information, the preference information being received from a server that maintains preferences of anonymized users who operate user devices.

Clause 37. The vending machine of clause 36, wherein the operations further comprise:
receiving a selection of a particular selectable option; and
providing the selection of the particular selectable option to the server, such that preference information of an anonymized user who operates the particular user device is updated.

Clause 38. The vending machine of clauses 36 to 37, wherein the one or more sensors comprise short-range communication devices.

Clause 39. The vending machine of clauses 36 to 38, wherein causing triggering of an application comprises:
providing information to the particular user device, the information being packaged for execution by an operating system of the particular user device, such that execution is associated with triggering of the application.

Clause 40. The vending machine of clause 36 to 39, wherein causing triggering of an application is further based on a time that the particular user device is within the threshold proximity exceeding a threshold amount of time.

Each of the processes, methods, and algorithms described in the preceding sections may be embodied in, and fully or partially automated by, code modules executed by one or more computer systems or computer processors comprising computer hardware. The code modules (or "engines") may be stored on any type of, one or more, non-transitory computer-readable media (e.g., a computer storage product) or computer storage devices, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on one or more computer readable media, such as compact discs, digital video discs, flash drives, or any other tangible media. Such software code may be stored, partially or fully, on a memory device of the executing computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

The various features and processes described herein may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y or Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y or at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated herein, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method comprising:
by a progressive authorization determination system that comprises one or more computers,
maintaining, in association with an account of a particular user, user profile information of the particular user;
receiving consent from the particular user to provide the user profile information to a content server;
subsequent to receiving the consent, monitoring identifying information, obtained from a user device over a first network connection, indicative of whether the particular user is operating the user device, wherein the user device detects the identifying information and accesses a content item hosted by the content server, wherein the content server is separate from, and is registered with, the progressive authorization determination system, and is configured to use profile information obtained from the progressive authorization determination system to provide content to users that are registered with the progressive authorization determination system, wherein the content item comprises code that, when executed by the user device, causes the user device to send at least some of the identifying information directly to the progressive authorization determination system;
determining, based on the identifying information, a confidence associated with the user device being operated by the particular user;
accessing the profile information of the particular user, and enabling access, by the content server over a second network connection, to a first portion of said profile information, the first portion associated with an authorization threshold satisfied based on the determined confidence;
receiving, based on one or more user actions associated with the content item, a request by the content server for a second portion of the profile information, the second portion associated with an authorization threshold greater than the satisfied authorization threshold;
determining whether the determined confidence satisfies the greater authorization threshold; and
if the determined confidence satisfies the greater authorization threshold, enabling access, by the content server, to the second portion of the profile information, or
if the determined confidence does not satisfy the greater authorization threshold, causing the user device to provide one or more prompts for additional identifying information, the additional identifying information enabling the progressive authorization determination system to determine whether to provide the content server with access to the second portion of the profile information.

2. The method of claim 1, wherein the one or more user actions associated with the content item comprise actions that trigger use of personally identifiable information associated with the particular user, or actions that trigger use of preference information associated with the particular user, the preference information being usable by the content server to customize the content item for the particular user.

3. The method of claim 1, wherein the first portion of the profile information includes one or more of a first name of the particular user or a shortened address of the particular user, and wherein the second portion of the profile information includes personally identifiable information of the particular user or preferences associated with the particular user.

4. The method of claim 3, wherein authorization thresholds associated with profile information are indicated based on access rights specified by the particular user.

5. The method of claim 1, wherein detecting identifying information comprises one or more of, detecting a cookie associated with the system on the user device, detecting biometric information associated with a user operating the user device, detecting location information of the user device, or detecting an identifier associated with the user device.

6. The method of claim 1, wherein determining a confidence associated with the user device is based on comparisons between (1) detected biometric information and stored biometric information associated with the particular user, (2) detected location information and stored location information indicating historical locations of the particular user, or (3) the detected identifier associated with the user device and identifiers of one or more user devices indicated, by the particular user, as being solely associated with the particular user.

7. The method of claim 6, wherein the identifiers of user devices indicated as being solely associated with particular user are further indicated as being user devices authorized, by the particular user, for use with the content server.

8. The method of claim 1, wherein the content item includes a widget associated with use of personally identifiable information by the system, and wherein the request for profile information is received from the content server in response to user actions associated with a presented widget.

9. The method of claim 1, wherein causing the user device to provide one or more prompts comprises providing information to the user device or the content server to present a prompt associated with input of biometric information, a prompt for input of personally identifiable information, or a prompt for input of responses to challenge questions.

10. The method of claim 1, wherein determining whether the determined confidence satisfies the greater authorization threshold comprises:
obtaining updated identifying information from the user device, the updated identifying information reflective of user interactions with the content item; and
updating the confidence based on the updated identifying information, wherein determining whether the determined confidence satisfies the greater authorization threshold is based on the updated confidence.

11. A method comprising:
by a system of one or more computers,
storing, in a data repository of the system, user profile information of a user, wherein storing the user profile information comprises storing a first portion of the user profile information in association with a first confidence threshold, and storing a second portion of the user profile information in association with a second confidence threshold that is higher than the first confidence threshold;

receiving consent from the user to provide the user profile information to a merchant;

after receiving the consent, obtaining, from a user device, information associated with the user, the user device being in communication with a content server that hosts interactive content of the merchant, wherein the interactive content comprises executable code that, when executed by the user device, causes the user device to send at least some of said information associated with the user to the system, wherein the user device and the content server are both registered with, and separate from, the system;

determining, based on the obtained information associated with the user, a confidence associated with the user device being operated by the user; and responding to one or more requests, from the content server, for profile information associated with the user, wherein responding comprises:

comparing the confidence to the first and second confidence thresholds;

in response to determining that the confidence satisfies the first confidence threshold, providing the content server access to the first portion of the user profile information; and in response to determining that the confidence satisfies the second confidence threshold, providing the content server access to the second portion of the user profile information.

12. The method of claim 11, wherein the user device is associated with an intelligent personal assistant that interacts with the user, and wherein the obtained information associated with the user includes one or more of voice information of the user or location information of the user device.

13. The method of claim 11, wherein the user device is associated with an intelligent personal assistant that enables communications between the user and the merchant, and wherein a request, from the content server, for profile information includes a request for preferences associated with the user or a request associated with personally identifiable information of the user.

14. The method of claim 11, wherein the user device presents a content item received from the content server, and wherein the content item is customized according to requested profile information associated with the user.

15. The method of claim 14, wherein the obtained information associated with the user includes one or more of a cookie associated with the system on the user device, biometric information associated with the user, location information of the user device, or an identifier associated with the user device.

16. The method of claim 11, wherein the one or more requests for profile information are received from the content server, and responded to by the system, using an application program interface of the system.

17. Non-transitory computer storage media storing instructions that when executed by a system of one or more computers, cause the system to perform operations comprising:

obtaining information, from a user device, indicating a user identity of a user operating the user device, the user device being in communication with a content server, and the content server hosting interactive content, the interactive content comprising executable code that, when executed by the user device, causes the user device to send at least some of said information directly to the system, wherein the user device and the content server are both registered with, and separate from, the system;

storing, in a data repository of the system, user profile information of the user, wherein storing the user profile information comprises storing a first portion of the user profile information in association with a first confidence threshold, and storing a second portion of the user profile information in association with a second confidence threshold that is higher than the first confidence threshold;

receiving consent from the user to provide the user profile information to an entity associated with the content server;

determining, based on the obtained information, a confidence associated with the user identity of the user; and responding to one or more requests, from the content server, for profile information associated with the user identity, wherein responding comprises:

comparing the confidence to the first and second confidence thresholds;

in response to determining that the confidence satisfies the first confidence threshold, providing the content server access to the first portion of the user profile information in accordance with said consent; and in response to determining that the confidence satisfies the second confidence threshold, providing the content server access to the second portion of the user profile information.

18. The non-transitory computer storage media of claim 17, wherein:

providing the content server access to the first portion of the user profile information comprises transmitting to the content server a first decryption key that enables the content server to decrypt an encrypted version of the first portion; and providing the content server access to the second portion of the user profile information comprises transmitting to the content server a second decryption key that enables the content server to decrypt an encrypted version of the second portion.

* * * * *